United States Patent
Friedrich et al.

(10) Patent No.: US 10,844,183 B2
(45) Date of Patent: Nov. 24, 2020

(54) WATER-SOLUBLE POLYVINYL ALCOHOL BLEND FILM, RELATED METHODS, AND RELATED ARTICLES

(71) Applicant: MONOSOL, LLC, Merrillville, IN (US)

(72) Inventors: Steven G. Friedrich, Crown Point, IN (US); David M. Lee, Crown Point, IN (US); Thomas J. Yogan, Valparaiso, IN (US); Regine Labeque, Brussels (BE)

(73) Assignee: MONOSOL, LLC, Merrillville, IN (US)

(*) Notice: Subject to any disclaimer, the term of this patent is extended or adjusted under 35 U.S.C. 154(b) by 0 days.

(21) Appl. No.: 15/519,032

(22) PCT Filed: Oct. 13, 2015

(86) PCT No.: PCT/US2015/055282
§ 371 (c)(1),
(2) Date: Apr. 13, 2017

(87) PCT Pub. No.: WO2016/061069
PCT Pub. Date: Apr. 21, 2016

(65) Prior Publication Data
US 2017/0226298 A1 Aug. 10, 2017

Related U.S. Application Data

(60) Provisional application No. 62/063,086, filed on Oct. 13, 2014, provisional application No. 62/063,075, filed on Oct. 13, 2014.

(51) Int. Cl.
*C08J 5/18* (2006.01)
*B65D 75/04* (2006.01)
(Continued)

(52) U.S. Cl.
CPC ............ *C08J 5/18* (2013.01); *B32B 1/02* (2013.01); *B32B 1/08* (2013.01); *B65D 75/04* (2013.01);
(Continued)

(58) Field of Classification Search
CPC .. B32B 1/02; B32B 1/08; B65D 75/04; B65D 75/06; B65D 75/08; B65D 75/12;
(Continued)

(56) References Cited

U.S. PATENT DOCUMENTS 2,220,099 A 11/1940 Guenther et al.
2,477,383 A 7/1949 Lewis
(Continued)

FOREIGN PATENT DOCUMENTS

CN 101203551 A 6/2008
EP 0 197 434 B1 7/1989
(Continued)

OTHER PUBLICATIONS

International Search Report and Written Opinion, International Application No. PCT/US2015/055282, dated May 27, 2016.
(Continued)

*Primary Examiner* — Walter Aughenbaugh
(74) *Attorney, Agent, or Firm* — Marshall, Gerstein & Borun LLP

(57) ABSTRACT

Disclosed herein are water-soluble films including a polyvinyl alcohol (PVOH) resin blend and optionally one or more additional components such as plasticizers, fillers, surfactants, and other additives. Also disclosed herein are articles including the water-soluble film and containing a composition such as a household care composition. The PVOH resin blend includes a PVOH copolymer including one or more types of anionic monomer units such as a PVOH terpolymer and a PVOH polymer such as a partially
(Continued)

or completely hydrolyzed PVOH homopolymer. When the PVOH copolymer and PVOH polymer are blended in particular proportions and/or selected with regard to various criteria related to the 4% solution viscosity of one or both of the PVOH polymer(s) and PVOH copolymer(s), the resulting water-soluble film formed from the PVOH resin blend exhibits substantially improved aqueous dissolution properties.

36 Claims, 2 Drawing Sheets

(51) Int. Cl.

| | | |
|---|---|---|
| B32B 1/02 | (2006.01) | |
| B65D 75/08 | (2006.01) | |
| B65D 75/20 | (2006.01) | |
| B65D 75/06 | (2006.01) | |
| B65D 75/12 | (2006.01) | |
| B65D 75/22 | (2006.01) | |
| B32B 1/08 | (2006.01) | |
| B65D 75/32 | (2006.01) | |
| B65D 75/30 | (2006.01) | |
| C11D 3/37 | (2006.01) | |
| C11D 17/04 | (2006.01) | |

(52) U.S. Cl.
CPC ............. *B65D 75/06* (2013.01); *B65D 75/08* (2013.01); *B65D 75/12* (2013.01); *B65D 75/20* (2013.01); *B65D 75/22* (2013.01); *B65D 75/30* (2013.01); *B65D 75/322* (2013.01); *C11D 3/3753* (2013.01); *C11D 17/042* (2013.01); *C11D 17/045* (2013.01); *C08J 2329/02* (2013.01); *C08J 2329/04* (2013.01); *C08J 2429/04* (2013.01)

(58) Field of Classification Search
CPC ........ B65D 75/20; B65D 75/22; B65D 75/30; B65D 75/322; C08J 5/18
See application file for complete search history.

(56) References Cited

U.S. PATENT DOCUMENTS

| | | | |
|---|---|---|---|
| 3,664,961 | A | 5/1972 | Norris |
| 3,919,678 | A | 11/1975 | Penfold |
| 3,929,678 | A | 12/1975 | Laughlin et al. |
| 3,975,280 | A | 8/1976 | Hachmann et al. |
| 4,000,093 | A | 12/1976 | Nicol et al. |
| 4,075,116 | A | 2/1978 | Mesaros |
| 4,222,905 | A | 9/1980 | Cockrell, Jr. |
| 4,239,659 | A | 12/1980 | Murphy |
| 4,246,612 | A | 1/1981 | Berry et al. |
| 4,259,217 | A | 3/1981 | Murphy |
| 4,810,410 | A | 3/1989 | Diakun et al. |
| 5,114,611 | A | 5/1992 | Van Kralingen et al. |
| 5,137,646 | A | 8/1992 | Schmidt et al. |
| 5,227,084 | A | 7/1993 | Martens et al. |
| 5,340,496 | A | 8/1994 | Sato et al. |
| 5,576,281 | A | 11/1996 | Bunch et al. |
| 5,807,810 | A | 9/1998 | Blezard et al. |
| 6,599,871 | B2 | 7/2003 | Smith |
| 6,787,512 | B1 | 9/2004 | Verrall et al. |
| 6,855,680 | B2 | 2/2005 | Smerznak et al. |
| 8,288,332 | B2 | 10/2012 | Fossum et al. |
| 10,240,114 | B2 | 3/2019 | Labeque et al. |
| 10,336,973 | B2 | 7/2019 | Labeque et al. |
| 10,513,588 | B2 | 12/2019 | Friedrich et al. |
| 10,526,479 | B2 | 1/2020 | Friedrich et al. |
| 2003/0060390 | A1 | 3/2003 | Demeyere et al. |
| 2003/0126282 | A1 | 7/2003 | Sarkar et al. |
| 2003/0139312 | A1 | 7/2003 | Caswell et al. |
| 2004/0204337 | A1 | 10/2004 | Corona et al. |
| 2006/0275567 | A1* | 12/2006 | Vicari .................. C11D 3/3753 428/35.7 |
| 2007/0219111 | A1 | 9/2007 | Ward et al. |
| 2008/0256822 | A1* | 10/2008 | Suzuki ...................... A23L 3/44 34/92 |
| 2009/0291282 | A1 | 11/2009 | Kitamura et al. |
| 2011/0189413 | A1 | 8/2011 | Denome et al. |
| 2014/0162929 | A1 | 6/2014 | Labeque et al. |
| 2014/0199460 | A1 | 7/2014 | Lee et al. |
| 2015/0096130 | A1* | 4/2015 | Bullock ............... C11D 3/0052 8/137 |
| 2020/0102434 | A1 | 4/2020 | Friedrich et al. |

FOREIGN PATENT DOCUMENTS

| | | |
|---|---|---|
| EP | 0414 549 A2 | 2/1991 |
| EP | 0884352 A1 | 12/1998 |
| EP | 1400460 A1 | 3/2004 |
| EP | 1512701 A1 | 3/2005 |
| EP | 2258820 A1 | 12/2010 |
| EP | 2397539 A1 | 12/2011 |
| EP | 1 907 524 B1 | 3/2012 |
| EP | 2740785 A1 | 6/2014 |
| GB | 1 137 741 A | 12/1968 |
| GB | 1 466 799 A | 3/1977 |
| GB | 8919254 | 10/1989 |
| JP | H09324096 A | 12/1997 |
| JP | H11222546 A | 8/1999 |
| JP | 2000-109574 A | 4/2000 |
| JP | 2003-206380 A | 7/2003 |
| JP | 2006063242 A | 3/2006 |
| RU | 94027683 A | 11/1996 |
| SU | 166096 | 11/1964 |
| TW | 200922467 A | 6/2009 |
| WO | WO-93/08874 A1 | 5/1993 |
| WO | WO-93/08876 A1 | 5/1993 |
| WO | WO-94/22800 A1 | 10/1994 |
| WO | WO-2009/152031 A1 | 12/2009 |
| WO | WO-2010/034736 A1 | 4/2010 |
| WO | WO-2014/026856 A1 | 2/2014 |
| WO | WO-2014/089386 A1 | 6/2014 |
| WO | WO-2014/110356 A1 | 7/2014 |

OTHER PUBLICATIONS

Russian Patent Application No. 2017115892/05, Official Action and Search Report, dated May 17, 2019.
Canadian Patent Application No. 2963697, Office Action, dated Jun. 3, 2019.
Taiwan Patent Application No. 104133492, Examination Report, dated Aug. 15, 2019.

* cited by examiner

WATER-SOLUBLE POLYVINYL ALCOHOL BLEND FILM, RELATED METHODS, AND RELATED ARTICLES

FIELD OF THE DISCLOSURE

The disclosure relates generally to water-soluble films which include a blend of polyvinyl alcohol (PVOH) resins and which can be used for contact with liquids, solids, or combinations thereof, for example household care compositions. The disclosure further relates to methods of making the films as well as articles such as packets and pouches made from the films, which are optionally filled with active components, e.g., detergents, to make measured dose pouches. More particularly, the disclosure relates to such films, packets, and pouches with one or more benefits such as improved solubility characteristics for end uses and/or resistance to change in solubility characteristics upon contact with chemicals, together with suitable processability.

BACKGROUND

Water-soluble polymeric films are commonly used as packaging materials to simplify dispersing, pouring, dissolving and dosing of a material to be delivered. For example, packets made from water-soluble film are commonly used to package household care compositions, e.g., a pouch containing a laundry or dish detergent. A consumer can directly add the pouch to a mixing vessel, such as a bucket, sink or washing machine. Advantageously, this provides for accurate dosing while eliminating the need for the consumer to measure the composition. The pouch may also reduce mess that would be associated with dispensing a similar composition from a vessel, such as pouring a liquid laundry detergent from a bottle. The pouch also insulates the composition therein from contact with the user's hands. In sum, soluble polymeric film packets containing pre-measured agents provide for convenience of consumer use in a variety of applications.

Some water-soluble polymeric films that are used to make packets will incompletely dissolve during a wash cycle, leaving film residue on items within the wash. Such problems may particularly arise when the pouch is used under stressed wash conditions, such as when the pouch is used in cold water (e.g., water as low as 5° C. and/or up to 10° C. or 15° C.), in a short wash cycle, and/or in a low-water wash cycle (e.g., wash liquors from about 3 L to about 20 L). Notably, environmental concerns and energy cost are driving consumer desire for utilizing colder wash water and shorter wash cycles.

There remains a need for water-soluble films and related articles such as packets having the desired characteristics of good water solubility (e.g., cold water solubility), chemical resistance, chemical and physical compatibility with laundry actives or other compositions in contact with the film or pouch formed therefrom, and desirable mechanical properties including good processability.

SUMMARY

The present disclosure relates a water-soluble film (e.g., which can be used to form articles such as pouches or packets, for example including a household care composition proximal thereto) including a polyvinyl alcohol (PVOH) resin blend and optionally one or more additional components such as plasticizers, fillers, surfactants, and other additives. The PVOH resin blend includes a PVOH copolymer including one or more types of anionic monomer units (e.g., a PVOH terpolymer) and a PVOH polymer (e.g., a partially or completely hydrolyzed PVOH homopolymer). When the PVOH copolymer and polymer are blended in particular proportions and/or selected with regard to various criteria related to the 4% solution viscosity of one or both of the PVOH (co)polymers, the resulting water-soluble film formed from the PVOH resin blend exhibits beneficial aqueous dissolution properties (optionally in combination with beneficial tensile strength properties, and/or tensile modulus properties) relative to both (i) comparable films formed from single PVOH anionic copolymers and (ii) comparable films formed from PVOH copolymer and polymer blends outside the selected proportions and/or the solution viscosity criteria. Optionally, the resulting water-soluble film formed from the PVOH resin blend further exhibits beneficial aqueous dissolution properties (optionally in combination with beneficial tensile strength properties, and/or tensile modulus properties) relative to comparable films formed from PVOH polymer blends without anionic monomer units (e.g., blends of partially or completely hydrolyzed PVOH homopolymers). Reduction or elimination of aqueous dissolution residue is particularly desirable in various washing operations, for example when a pouch formed from the water-soluble film and containing a cleaning composition (e.g., a laundry or dishwashing cleaning composition) is used to clean one or more articles (e.g., laundry or dishware), insofar as it is desirable for the cleaned articles to be free from polymeric film residue.

One aspect of the disclosure relates to a water-soluble film including: a polyvinyl alcohol (PVOH) resin blend including: a first PVOH copolymer including an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$); wherein: an absolute viscosity difference $|\mu_2-\mu_1|$ for the first PVOH copolymer and the second PVOH polymer is in a range of 0 cP to about 10 cP, and the first PVOH copolymer is present in an amount in a range of about 30 wt. % to about 90 wt. % of total PVOH polymers and PVOH copolymers in the film.

Another aspect of the disclosure relates to a water-soluble film including: a polyvinyl alcohol (PVOH) resin blend including: a first PVOH copolymer including an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$); wherein: an absolute viscosity difference $|\mu_2-\mu_1|$ for the first PVOH copolymer and the second PVOH polymer is in a range of 0 cP to about 10 cP, and the anionic monomer unit is present in the film in an amount in a range of about 1.0 mol. % to about 4.2 mol. % of total PVOH polymers and PVOH copolymers in the film.

Another aspect of the disclosure relates to a water-soluble film including: a polyvinyl alcohol (PVOH) resin blend including: a first PVOH copolymer including an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$) of about 20 cP or less; wherein: the first PVOH copolymer is present in an amount in a range of about 30 wt. % to about 90 wt. % of total PVOH polymers and copolymers in the film.

Another aspect of the disclosure relates to a water-soluble film including: a polyvinyl alcohol (PVOH) resin blend including: a first PVOH copolymer including an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$) of about 20 cP or less; wherein: the anionic monomer unit is present in the film in an amount in a range of about 1.0 mol. % to about 4.2 mol. % of total PVOH polymers and PVOH copolymers in the film.

Another aspect of the disclosure relates to a water-soluble film including: a polyvinyl alcohol (PVOH) resin blend including: a first PVOH copolymer comprising a first anionic monomer unit; and a second PVOH polymer consisting essentially of vinyl alcohol monomer units and optionally vinyl acetate monomer units; wherein the first PVOH copolymer is present in an amount in a range of about 30 wt. % to about 70 wt. % of total PVOH polymers and PVOH copolymers in the film.

Another aspect of the disclosure relates to an article including a water-soluble film and a household care composition proximal to the film, where the film includes: a polyvinyl alcohol (PVOH) resin blend including: a first PVOH copolymer including an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$); wherein: an absolute viscosity difference $|\mu_2-\mu_1|$ for the first PVOH copolymer and the second PVOH polymer is in a range of 0 cP to about 10 cP, and the first PVOH copolymer is present in an amount in a range of about 30 wt. % to about 90 wt. % of total PVOH polymers and PVOH copolymers in the film.

Another aspect of the disclosure relates to an article including a water-soluble film and a household care composition proximal to the film, where the film includes: a polyvinyl alcohol (PVOH) resin blend including: a first PVOH copolymer including an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$); wherein: an absolute viscosity difference $|\mu_2-\mu_1|$ for the first PVOH copolymer and the second PVOH polymer is in a range of 0 cP to about 10 cP, and the anionic monomer unit is present in the film in an amount in a range of about 1.0 mol. % to about 4.2 mol. % of total PVOH polymers and PVOH copolymers in the film.

Another aspect of the disclosure relates to an article including a water-soluble film and a household care composition proximal to the film, where the film includes: a polyvinyl alcohol (PVOH) resin blend including: a first PVOH copolymer including an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$) of about 20 cP or less; wherein: the first PVOH copolymer is present in an amount in a range of about 30 wt. % to about 90 wt. % of total PVOH polymers and copolymers in the film.

Another aspect of the disclosure relates to an article including a water-soluble film and a household care composition, where the film includes: a polyvinyl alcohol (PVOH) resin blend including: a first PVOH copolymer including an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$) of about 20 cP or less; wherein: the anionic monomer unit is present in the film in an amount in a range of about 1.2 mol. % to about 4.2 mol. % of total PVOH polymers and PVOH copolymers in the film.

Another aspect of the disclosure relates to an article including a water-soluble film and a household care composition proximal to the film, where the film includes: a polyvinyl alcohol (PVOH) resin blend including: a first PVOH copolymer comprising a first anionic monomer unit; and a second PVOH polymer consisting essentially of vinyl alcohol monomer units and optionally vinyl acetate monomer units; wherein the first PVOH copolymer is present in an amount in a range of about 30 wt. % to about 70 wt. % of total PVOH polymers and PVOH copolymers in the film.

Another aspect of the disclosure relates to an article including: a water-soluble film according to any of the variously disclosed embodiments in the form of a pouch defining an interior pouch volume (e.g., further including a composition, such as a household care composition, contained in the interior pouch volume).

In a particular refinement of the various embodiments, the anionic monomer is selected from the group consisting of acrylamido methylpropanesulfonic acids, alkali metal salts thereof, and combinations thereof. In another refinement of the various embodiments, the anionic monomer is selected from the group consisting of monomethyl maleate, alkali metal salts thereof, and combinations thereof. In another refinement of the various embodiments, the anionic monomer unit is present in first PVOH copolymer in an amount in a range of about 2 mol. % to about 10 mol. %. In another refinement of the various embodiments, a viscosity difference ($\mu_2-\mu_1$) for the first PVOH copolymer and the second PVOH polymer is in a range from about 0 cP to about 10 cP (e.g., about 0 cP to about 5 cP). In another refinement of the various embodiments, the first viscosity $\mu_1$ is in a range of about 4 cP to about 24 cP (e.g., about 8 cP to about 16 cP). In another refinement of the various embodiments, the second viscosity $\mu_2$ is in a range of about 4 cP to about 24 cP (e.g., about 8 cP to about 16 cP). In another refinement of the various embodiments, the water-soluble film has a residue value of about 45 wt. % or less as measured by the Dissolution Chamber Test (e.g., about 10 wt. % or 20 wt. % to about 40 wt. % or 45 wt. %). In another refinement of the various embodiments, the second PVOH polymer is present in an amount in a range of about 10 wt. % to about 70 wt. % of total PVOH polymers and PVOH copolymers in the film (e.g., where the first PVOH copolymer is present in an amount in a range of about 30 wt. % to about 90 wt. % of total PVOH polymers and PVOH copolymers in the film).

Another aspect of the disclosure relates to a method of forming the articles described herein, where the method includes the steps of: providing the water-soluble film, where the film defines an interior pouch container volume; filling the container volume with a composition (e.g., a household care composition); and sealing the film to form a sealed compartment, wherein the sealed compartment contains the composition.

Another aspect of the disclosure relates to a method of treating a substrate, where the method includes the step of contacting the substrate with an article as described herein.

For the compositions and methods described herein, optional features, including but not limited to components, compositional ranges thereof, substituents, conditions, and steps, are contemplated to be selected from the various aspects, embodiments, and examples provided herein.

Further aspects and advantages will be apparent to those of ordinary skill in the art from a review of the following detailed description and accompanying drawings. While the compositions and methods are susceptible of embodiments in various forms, the description hereafter includes specific embodiments with the understanding that the disclosure is illustrative, and is not intended to limit the invention to the specific embodiments described herein.

DESCRIPTION OF THE DRAWINGS

The following detailed description of the various disclosed methods, processes, compositions, and articles refers to the accompanying drawings in which.

DETAILED DESCRIPTION

Figure 1:
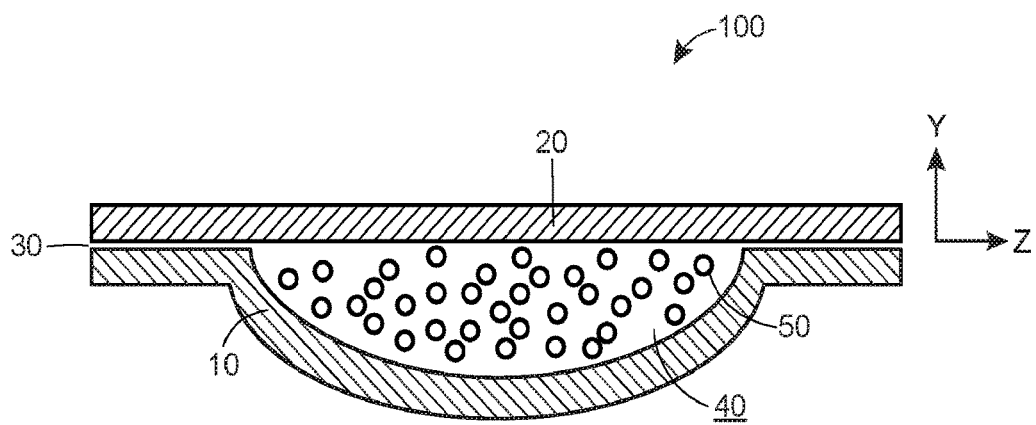
FIG. 1 is a side cross-sectional view of water-soluble pouch article for the aqueous delivery of a delayed release capsule in combination with another composition according to the disclosure.

Disclosed herein are water-soluble films including blends of polyvinyl alcohol polymers and articles such as delivery pouches formed from or otherwise including the films, where the articles or pouches can further include a household care composition.

Some water-soluble polymeric films that are used to make articles such as packets (e.g., which can contain a household care composition therein) will incompletely dissolve in water during normal use, for example during a laundry wash cycle for packets containing a laundry-related composition (e.g., thereby leaving film residue on items within the wash).

Water-soluble polymeric films based on PVOH can be subject to changes in solubility characteristics. The acetate group in the co-poly(vinyl acetate vinyl alcohol) polymer is known by those skilled in the art to be hydrolysable by either acid or alkaline hydrolysis. As the degree of hydrolysis increases, a polymer composition made from the PVOH homopolymer resin will have increased mechanical strength but reduced solubility at lower temperatures (e.g., requiring hot water temperatures for complete dissolution). Accordingly, exposure of a PVOH homopolymer resin to an alkaline environment (e.g., resulting from a laundry bleaching additive) can transform the resin from one which dissolves rapidly and entirely in a given aqueous environment (e.g., a cold water medium) to one which dissolves slowly and/or incompletely in the aqueous environment, potentially resulting in undissolved polymeric residue at the end of a wash cycle. This is an inherent weakness in the application of films based on just the vinyl acetate/alcohol co-polymer typified by commercial PVOH homopolymer resins.

PVOH copolymer resins with pendant carboxyl groups, such as vinyl alcohol/hydrolyzed methyl acrylate sodium salt resins, can form lactone rings between neighboring pendant carboxyl and alcohol groups, thus reducing the water solubility of the PVOH copolymer resin. In the presence of a strong base such as a laundry bleaching additive, the lactone rings can open over the course of several weeks at relatively warm (ambient) and high humidity conditions (e.g., via lactone ring-opening reactions to form the corresponding pendant carboxyl and alcohol groups with increased water solubility). Thus, contrary to the effect observed with PVOH homopolymer films, it is believed that such a PVOH copolymer film can become more soluble due to chemical interactions between the film and an alkaline composition inside the pouch during storage. Consequently, as they age, the packets may become increasingly prone to premature dissolution during a hot wash cycle (nominally 40° C.), and may in turn decrease the efficacy of certain laundry actives due to the presence of the bleaching agent and the resulting pH influence.

The present disclosure includes a water-soluble film including a polyvinyl alcohol (PVOH) resin blend and optionally one or more additional components such as plasticizers, fillers, surfactants, and other additives as described in more detail below. The present disclosure further includes an article or packet including the water-soluble film, for example containing a household care composition. The PVOH resin blend includes a first PVOH resin which is a PVOH copolymer ("first PVOH copolymer") including one or more types of anionic monomer units (e.g., a PVOH ter- (or higher co-) polymer) and a second PVOH resin which is a PVOH polymer ("second PVOH polymer") including vinyl alcohol monomer units and (optionally) vinyl acetate monomer units (e.g., a PVOH homopolymer which is either completely hydrolyzed polyvinyl alcohol or a partially hydrolyzed combination of poly(vinyl alcohol-co-vinyl acetate). In some aspects, the PVOH resin blend includes only the first PVOH copolymer and the second PVOH polymer (e.g., a binary blend of the two polymers). Alternatively or additionally, the PVOH resin blend, the water-soluble film, or both can be characterized as being free or substantially free from other polymers (e.g., other water-soluble polymers generally, other PVOH-based polymers specifically, or both). In other aspects, the water-soluble film can include one or more additional water-soluble polymers. For example, the PVOH resin blend can include a (third) PVOH polymer, a fourth PVOH polymer, a fifth PVOH polymer, etc. (e.g., one or more additional PVOH homopolymers or PVOH copolymers, with or without anionic monomer units). For example, the water-soluble film can include at least a third (or fourth, fifth, etc.) water-soluble polymer which is other than a PVOH polymer (e.g., other than PVOH homopolymers or PVOH copolymers, with or without anionic monomer units).

The PVOH copolymer can be a PVOH terpolymer including vinyl alcohol monomer units, vinyl acetate monomer units (i.e., when not completely hydrolyzed), and a single type of anionic monomer unit (e.g., a where a single type of monomer unit can include equivalent acid forms, salt forms, and optionally ester forms of the anionic monomer unit). In some aspects, the PVOH copolymer can include two or more types of anionic monomer units. General classes of anionic monomer units which can be used for the PVOH corpolymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations thereof (e.g., multiple types of anionic monomers or equivalent forms of the same anionic monomer). In an aspect, the anionic monomer can be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. In an aspect, the anionic monomer can be one or more of monomethyl maleate, alkali metal salts thereof (e.g., sodium salts), and combinations thereof.

The level of incorporation of the one or more anionic monomer units in the PVOH copolymers (e.g., the first PVOH copolymer) is not particularly limited. In some aspects, the one or more anionic monomer units are present in a first PVOH copolymer in an amount in a range of about 2 mol. % to about 10 mol. % or about 3 mol. % to about 5 mol. % (e.g., at least 2.0, 2.5, 3.0, 3.5, or 4.0 mol. % and/or up to about 3.0, 4.0, 4.5, 5.0, 6.0, 8.0, or 10 mol. % in various embodiments), individually or collectively. For example, the one or more anionic monomer units can be present in a first PVOH copolymer in an amount in a range of about 5 mol. % to about 10 mol. % (e.g., at least 5.0 or 6.0 mol. % and/or up to about 7.0, 8.0, or 10 mol. % in various embodiments), individually or collectively. Alternatively or additionally, the one or more anionic monomer units can be present in the water-soluble film in an amount in a range of about 3 mol. % to about 4.2 mol. %, collectively, of total PVOH polymers and copolymers in the film (e.g., at least 3.0 or 3.5 mol. % and/or up to about 3.7, 4.0, or 4.2 mol. % in various embodiments). In another aspect, the one or more anionic monomer units in the first PVOH polymer can be present in the water-soluble film in an amount in a range of about 1 mol. % to about 3 mol. %, collectively, of total PVOH polymers and copolymers in the film. For example, an anionic PVOH copolymer can be blended with a PVOH polymer (e.g., about 40%/60% to 60%/40% (w/w) blend) to achieve an average blend anionic monomer unit content in a range of about 3 mol. % to about 4.2 mol. % in the neighborhood where the Dissolution Chamber residue curve approaches zero as a function of anionic monomer content. In an embodiment, the first anionic monomer can be present in an amount less than about 3 mol. % of total PVOH polymers and PVOH copolymers in the film The water-soluble film can contain at least about 50 wt. %, 55 wt. %, 60 wt. %, 65 wt. %, 70 wt. %, 75 wt. %, 80 wt. %, 85 wt. %, or 90 wt. % and/or up to about 60 wt. %, 70 wt. %, 80 wt. %, 90 wt. %, 95 wt. %, or 99 wt. % of the PVOH resin blend. In one aspect, the first PVOH copolymer is present in the water-soluble film in an amount in a range of about 30 wt. % to about 90 wt. % (or about 40 wt. % to about 60 wt. %, about 40 wt. % to about 70 wt. %, about 30 wt. % to about 70 wt. %) of total PVOH polymers and PVOH copolymers in the film (i.e., relative to the PVOH resin blend weight). For example, the first PVOH copolymer can be present in an amount of at least 30 wt. %, 40 wt. %, 45 wt. %, 50 wt. %, 55 wt. %, 60 wt. %, or 65 wt. % and/or up to about 55 wt. %, 60 wt. %, 65 wt. %, 70 wt. %, 75 wt. %, 80 wt. %, 85 wt. % or 90 wt. % of total PVOH polymers and PVOH copolymers in the film. In another aspect, the foregoing concentrations of first PVOH copolymer alternatively or additionally can be relative to total water-soluble polymer content in film, PVOH or otherwise. In an aspect, the second PVOH polymer is present in an amount in a range of about 10 wt. % to about 70 wt. % (or about 30 wt. % to about 60 wt. %, about 40 wt. % to about 60 wt. %, about 30 wt. % to about 70 wt. %) of total PVOH polymers and PVOH copolymers in the film (i.e., relative to the PVOH resin blend weight). For example, the second PVOH polymer can be present in an amount of at least 10 wt. %, 20 wt. %, 30 wt. %, or 40 wt. % and/or up to about 40 wt. %, 50 wt. %, 60 wt. %, or 70 wt. % of total PVOH polymers and PVOH copolymers in the film. In another aspect, the foregoing concentrations of second PVOH polymer alternatively or additionally can be relative to total water-soluble polymer content in film, PVOH or otherwise.

Alternatively or additionally to the relative amounts of polymeric resins, PVOH or otherwise, the water-soluble film can be characterized in terms of the molar content of the anionic monomer units in the film (in particular relative to the polymeric resin content thereof). In one aspect, the one or more anionic monomer units are present in the film in an amount ranging from about 1.0 mol. % to about 4.2 mol. % (or about 1 mol. % to about 3.4 mol. %, or about 1.4 mol. % to about 2.6 mol. %), individually or collectively, of total PVOH polymers and PVOH copolymers in the film. For example, the one or more anionic monomer units can be present in the film in an amount of at least 1.0, 1.2, 1.4, 1.6, 1.8, 2.0, 2.2, 2.5, or 3.0 mol. % and/or up to about 2.5, 3.0, 3.4, 3.6, 3.8, 4.0 or 4.2 mol. %. individually or collectively. The anionic monomer unit content alternatively or additionally can be expressed relative to total water-soluble polymer content in film, PVOH or otherwise.

As described in more detail below, PVOH polymer and PVOH copolymer resins can be characterized in terms of their 4% solution viscosity values at 20° C. in water (i.e., as values which generally correlate to the molecular weights of the resins). For reference, the first PVOH copolymer is denoted as having a first 4% solution viscosity at 20° C. ($\mu_1$), and the second PVOH polymer is denoted as having a second 4% solution viscosity at 20° C. ($\mu_2$). In one aspect of the disclosure, an absolute viscosity difference $|\mu_2-\mu_1|$ for the first PVOH copolymer and the second PVOH polymer in the PVOH resin blend is in a range of 0 cP to about 10 cP (e.g., up to about 1, 2, 5, or 10 cP; about 0 cP). In another aspect of the disclosure, the second PVOH polymer can have a second 4% solution viscosity at 20° C. ($\mu_2$) of about 20 cP or less (e.g., at least about 4, 8, 10, or 12 cP and/or up to about 12, 16, or 20 cP). In either or both of the foregoing aspects, a viscosity difference ($\mu_2-\mu_1$) for the first PVOH copolymer and the second PVOH polymer can be in a range from about 0 cP to about 10 cP (e.g., at least about 0, 0.5, 1, or 2 cP and/or up to about 1, 2, 5, or 10 cP, such as about 0 cP to about 5 cP or about 0 cP to about 2 cP). In an aspect, the first PVOH copolymer and the second PVOH polymer have 4% solution viscosity values at 20° C. that are within about 10 cP of each other. In another aspect, the first PVOH copolymer and the second PVOH polymer have 4% solution viscosity values at 20° C. that are more than about 10 cP apart from each other. In various embodiments, the first viscosity $\mu_1$ can be in a range of about 4 cP to about 24 cP (e.g., at least about 4, 8, 10 or 12 cP and/or up to about 12, 16, 20, or 24 cP, such as about 10 cP to about 16 cP or about 10 cP to about 20 cP). Alternatively or additionally, the second viscosity $\mu_2$ can be in a range of about 4 cP to about 24 cP, about 8 cP to about 16 cP, or about 20 cP to about 30 cP (e.g., at least about 4, 8, 10 or 12 cP and/or up to about 12, 16, 20, or 24 cP, such as about 10 cP to about 16 cP or about 10 cP to about 20 cP). When the PVOH resin blend includes three or more PVOH resins selected from PVOH polymer and PVOH copolymer resins, the foregoing viscosity values can apply to each PVOH polymer or PVOH copolymer individually and the foregoing viscosity differences can apply to each PVOH polymer/PVOH copolymer pair in the PVOH resin blend and resulting water-soluble film.

The disclosed water-soluble films, articles such as delivery pouches including the films, and related methods are contemplated to include embodiments including any combination of one or more of the additional optional elements, features, and steps further described below (including those shown in the figures and examples), unless stated otherwise.

In any embodiment, the water-soluble article or pouch can contain a composition, for example a household care composition. The composition can be selected from a liquid, solid or combination thereof. As used herein, "liquid" includes free-flowing liquids, as well as pastes, gels, foams and mousses. Non-limiting examples of liquids include light duty and heavy duty liquid detergent compositions, fabric enhancers, detergent gels commonly used for laundry, bleach and laundry additives. Gases, e.g., suspended bubbles, or solids, e.g. particles, may be included within the liquids. A "solid" as used herein includes, but is not limited to, powders, agglomerates, and mixtures thereof. Non-limiting examples of solids include: granules, micro-capsules, beads, noodles, and pearlised balls. Solid compositions may provide a technical benefit including, but not limited to, through-the-wash benefits, pre-treatment benefits, and/or aesthetic effects.

In any of the laundry-centric embodiments, the composition may be selected from the group of liquid light duty and liquid heavy duty liquid detergent compositions, powdered detergent compositions, fabric enhancers, detergent gels commonly used for laundry, and bleach (e.g., organic or inorganic bleach) and laundry additives, for example.

As used herein, the term "homopolymer" generally includes polymers having a single type of monomeric repeating unit (e.g., a polymeric chain consisting of or consisting essentially of a single monomeric repeating unit). For the particular case of PVOH, the term "homopolymer" (or "PVOH homopolymer" or "PVOH polymer") further includes copolymers having a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a PVOH homopolymer can include a true homopolymer having only vinyl alcohol units.

As used herein, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of PVOH, the term "copolymer" (or "PVOH copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic monomer units). In the limiting case of 100% hydrolysis, a PVOH copolymer can include a copolymer having vinyl alcohol units and one or more other monomer units, but no vinyl acetate units.

As used herein, the term "comprising" indicates the potential inclusion of other agents, elements, steps, or features, in addition to those specified.

As used herein and unless specified otherwise, the terms "wt. %" and "wt %" are intended to refer to the composition of the identified element in "dry" (non water) parts by weight of the entire film (when applicable) or parts by weight of the entire composition enclosed within a pouch (when applicable). As used herein and unless specified otherwise, the term "phr" is intended to refer to the composition of the identified element in parts per one hundred parts water-soluble polymer (or resin; whether PVOH or otherwise) in the water-soluble film.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

Water-Soluble Film Compositions

Water-soluble film compositions, optional ingredients for use therein, and methods of making the same are well known in the art, whether being used for making relatively thin water-soluble films (e.g., as pouch materials) or otherwise.

In one class of embodiments, the water-soluble film includes polyvinyl alcohol (PVOH), including homopolymers thereof (e.g., including substantially only vinyl alcohol and vinyl acetate monomer units) and copolymers thereof (e.g., including one or more other monomer units in addition to vinyl alcohol and vinyl acetate units). PVOH is a synthetic resin generally prepared by the alcoholysis, usually termed hydrolysis or saponification, of polyvinyl acetate. Fully hydrolyzed PVOH, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). An intermediate cold or hot water soluble film can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type is technically a vinyl alcohol-vinyl acetate copolymer.

The degree of hydrolysis (DH) of the PVOH polymers and PVOH copolymers included in the water-soluble films of the present disclosure can be in a range of about 75% to about 99% (e.g., about 79% to about 92%, about 86.5% to about 89%, or about 88%, such as for cold-water soluble compositions; about 90% to about 99%, about 92% to about 99%, or about 95% to about 99%). As the degree of hydrolysis is reduced, a film made from the resin will have reduced mechanical strength but faster solubility at temperatures below about 20° C. As the degree of hydrolysis increases, a film made from the polymer will tend to be mechanically stronger and the thermoformability will tend to decrease. The degree of hydrolysis of the PVOH can be chosen such that the water-solubility of the polymer is temperature dependent, and thus the solubility of a film made from the polymer, any compatibilizer polymer, and additional ingredients is also influenced. In one option the film is cold water-soluble. A cold water-soluble film, soluble in water at a temperature of less than 10° C., can include PVOH with a degree of hydrolysis in a range of about 75% to about 90%, or in a range of about 80% to about 90%, or in a range of about 85% to about 90%. In another option the film is hot water-soluble. A hot water-soluble film, soluble in water at a temperature of at least about 60° C., can include PVOH with a degree of hydrolysis of at least about 98%.

Other water soluble polymers for use in addition to the PVOH polymers and PVOH copolymers in the blend can include, but are not limited to modified polyvinyl alcohols, polyacrylates, water-soluble acrylate copolymers, polyvinyl pyrrolidone, polyethyleneimine, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, and polymethacrylates. Such water-soluble polymers, whether PVOH or otherwise are commercially available from a variety of sources. Any of the foregoing water-soluble polymers are generally suitable for use as film-forming polymers. In general, the water-soluble film can include copolymers and/or blends of the foregoing resins.

The water-soluble polymers (e.g., the PVOH resin blend alone or in combination with other water-soluble polymers) can be included in the film in an amount in a range of about 30 wt. % or 50 wt. % to about 90 wt. % or 95 wt. %, for example. The weight ratio of the amount of all water-soluble polymers as compared to the combined amount of all plasticizers, compatibilizing agents, and secondary additives can be in a range of about 0.5 to about 18, about 0.5 to about 15, about 0.5 to about 9, about 0.5 to about 5, about 1 to 3, or about 1 to 2, for example. The specific amounts of plasticizers and other non-polymer component can be selected in a particular embodiment based on an intended application of the water-soluble film to adjust film flexibility and to impart processing benefits in view of desired mechanical film properties.

Water-soluble polymers for use in the film described herein (including, but not limited to PVOH polymers and PVOH copolymers) can be characterized by a viscosity in a range of about 3.0 to about 27.0 cP, about 4.0 to about 24.0 cP, about 4.0 to about 23.0 cP, about 4.0 cP to about 15 cP, or about 6.0 to about 10.0 cP, for example. The viscosity of a polymer is determined by measuring a freshly made solution using a Brookfield LV type viscometer with UL adapter as described in British Standard EN ISO 15023-2: 2006 Annex E Brookfield Test method. It is international practice to state the viscosity of 4% aqueous polyvinyl alcohol solutions at 20° C. Polymeric viscosities specified herein in cP should be understood to refer to the viscosity of a 4% aqueous water-soluble polymer solution at 20° C., unless specified otherwise.

It is well known in the art that the viscosity of a water-soluble polymer (PVOH or otherwise) is correlated with the weight-average molecular weight ($\overline{M}w$) of the same polymer, and often the viscosity is used as a proxy for $\overline{M}w$. Thus, the weight-average molecular weight of the water-soluble polymers, including the first PVOH copolymer and second PVOH polymer, can be in a range of about 30,000 to about 175,000, or about 30,000 to about 100,000, or about 55,000 to about 80,000, for example.

The water-soluble film can contain other auxiliary agents and processing agents, such as, but not limited to, plasticizers, plasticizer compatibilizers, surfactants, lubricants, release agents, fillers, extenders, cross-linking agents, anti-blocking agents, antioxidants, detackifying agents, anti-foams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Embodiments including plasticizers are preferred. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt %, individually or collectively.

The plasticizer can include, but is not limited to, glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol, ethanolamines, and a mixture thereof. A preferred plasticizer is glycerin, sorbitol, triethyleneglycol, propylene glycol, diproylene glycol, 2-methyl-1,3-propanediol, trimethylolpropane, or a combination thereof. The total amount of the plasticizer can be in a range of about 10 wt. % to about 40 wt. %, or about 15 wt. % to about 35 wt. %, or about 20 wt. % to about 30 wt. %, for example about 25 wt. %, based on total film weight. Combinations of glycerin, dipropylene glycol, and sorbitol can be used. Optionally, glycerin can be used in an amount of about 5 wt % to about 30 wt %, or 5 wt % to about 20 wt %, e.g., about 13 wt %. Optionally, dipropylene glycol can be used in an amount of about 1 wt. % to about 20 wt. %, or about 3 wt. % to about 10 wt. %, for example 6 wt. %. Optionally, sorbitol can be used in an amount of about 1 wt % to about 20 wt %, or about 2 wt % to about 10 wt %, e.g., about 5 wt %. The specific amounts of plasticizers can be selected in a particular embodiment based on desired film flexibility and processability features of the water-soluble film. At low plasticizer levels, films may become brittle, difficult to process, or prone to breaking. At elevated plasticizer levels, films may be too soft, weak, or difficult to process for a desired use.

Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. In various embodiments, the amount of surfactant in the water-soluble film is in a range of about 0.1 wt % to 2.5 wt %, optionally about 1.0 wt % to 2.0 wt %.

Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. In one type of embodiment, the amount of lubricant/release agent in the water-soluble film is in a range of about 0.02 wt % to about 1.5 wt %, optionally about 0.1 wt % to about 1 wt %.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. In one type of embodiment, the amount of filler/extender/antiblocking agent/detackifying agent in the water-soluble film is in a range of about 0.1 wt % to about 25 wt %, or about 1 wt % to about 10 wt %, or about 2 wt. % to about 8 wt. %, or about 3 wt. % to about 5 wt. %. In the absence of starch, one preferred range for a suitable filler/extender/antiblocking agent/detackifying agent is about 0.1 wt % or 1 wt % to about 4 wt % or 6 wt %, or about 1 wt. % to about 4 wt. %, or about 1 wt. % to about 2.5 wt. %.

The water-soluble film can further have a residual moisture content of at least 4 wt. %, for example in a range of about 4 to about 10 wt. %, as measured by Karl Fischer titration.

Other features of water-soluble polymer compositions such as films, may be found in U.S. Publication No. 2011/0189413 and U.S. application Ser. No. 13/740,053, both of which are incorporated by reference herein in their entireties.

Method of Making Film

One contemplated class of embodiments is characterized by the water-soluble film being formed by, for example, admixing, co-casting, or welding the first PVOH copolymer and the second PVOH polymer according to the types and amounts described herein, together with the preferred and optional secondary additives described herein. If the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. Another contemplated class of embodiments is characterized by the water-soluble film being formed by extrusion, for example, blown extrusion. In one contemplated non-limiting embodiment a PVOH polymer and an acrylamido methylpropanesulfonic acid PVOH terpolymer blended film is formed by blown extrusion.

The film can have any suitable thickness. For example, the film can have a thickness in a range of about 5 to about 200 μm, or in a range of about 20 to about 100 μm, or about 40 to about 85 μm, for example 76 μm.

Optionally, the water-soluble film can be a free-standing film consisting of one layer or a plurality of like layers.

The film is useful for creating an article such as a packet to contain a detergent composition comprising cleaning actives thereby forming a pouch. The cleaning actives may take any form such as powders, gels, pastes, liquids, tablets or any combination thereof. The film is also useful for any other application in which improved wet handling and low cold water residues are desired. The film forms at least one side wall of the pouch and/or packet, optionally the entire pouch and/or packet, and preferably an outer surface of the at least one sidewall.

The film described herein can also be used to make an article such as a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the packet material, for example the PVOH resin blend, as described above, being at least 60%.

Articles and Pouches

The articles of the present disclosure include a water soluble film and can include a composition, typically a household care composition, that is proximal to the film.

The articles of the present disclosure can include pouches that include at least one sealed compartment. Thus, the pouches may comprise a single compartment or multiple compartments. FIG. 1 illustrates an article in which a water-soluble pouch 100 is formed from water-soluble polymer films 10, 20 sealed at an interface 30. One or both of the films 10, 20 include the PVOH resin blend of the first PVOH copolymer and the second PVOH polymer. The films 10, 20 define an interior pouch container volume 40 which contains any desired composition 50 for release into an aqueous environment. The composition 50 is not particularly limited, for example including any of the variety of cleaning compositions described below. In embodiments comprising multiple compartments (not shown), each compartment may contain identical and/or different compositions. In turn, the compositions may take any suitable form including, but not limited to liquid, solid and combinations thereof (e.g. a solid suspended in a liquid). In some embodiments, the pouches comprises a first, second and third compartment, each of which respectively contains a different first, second, and third composition.

The compartments of multi-compartment pouches may be of the same or different size(s) and/or volume(s). The compartments of the present multi-compartment pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. In some embodiments, the first compartment may be surrounded by at least the second compartment, for example in a tire-and-rim configuration, or in a pouch-in-a-pouch configuration.

In some embodiments, multi-compartment pouches comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In some embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In some embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The articles, pouches, and/or packets of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions. In one embodiment, a multi-compartment pouch comprises at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

Articles such as pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which articles such as packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and that the mold sizes are adjusted accordingly.

In one embodiment, the packet or other article comprises a first and a second sealed compartment. The second compartment is in a generally superposed relationship with the first sealed compartment such that the second sealed compartment and the first sealed compartment share a partitioning wall interior to the pouch.

In one embodiment, the packet or other article comprising a first and a second compartment further comprises a third sealed compartment. The third sealed compartment is in a generally superposed relationship with the first sealed compartment such that the third sealed compartment and the first sealed compartment share a partitioning wall interior to the pouch.

In some embodiments, the first composition and the second composition are selected from one of the following combinations: liquid, liquid; liquid, powder; powder, powder; and powder, liquid.

In some embodiments, the first, second and third compositions are selected from one of the following combinations: solid, liquid, liquid and liquid, liquid, liquid.

In one embodiment, the single compartment or plurality of sealed compartments contains a composition. The plurality of compartments may each contain the same or a different composition. The composition is selected from a liquid, solid or combination thereof.

In one embodiment, the composition may be selected from the group of liquid light duty and liquid heavy duty liquid detergent compositions, powdered detergent compositions, dish detergent for hand washing and/or machine washing; hard surface cleaning compositions, fabric enhancers, detergent gels commonly used for laundry, and bleach and laundry additives, shampoos, and body washes.

Shaping, Sealing, and Thermoforming

A contemplated class of embodiments is characterized by good thermoformability of the water-soluble film made as described herein. A thermoformable film is one that can be shaped through the application of heat and a force.

Thermoforming a film is the process of heating the film, shaping it in a mold, and then allowing the film to cool, whereupon the film will hold the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In some embodiments, the film is heated using an infrared light. The film may be heated to a temperature of about 50 to about 150° C., about 50 to about 120° C., about 60 to about 130° C., about 70 to about 120° C., or about 60 to about 90° C. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The filling of the molded film can be accomplished by utilizing any suitable means. In some embodiments, the most preferred method will depend on the product form and required speed of filling. In some embodiments, the molded film is filled by in-line filling techniques. The filled, open packets are then closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment pouches may be made together in a side-by-side style wherein the resulting, cojoined pouches may or may not be separated by cutting. Alternatively, the compartments can be made separately.

In some embodiments, pouches may be made according to a process comprising the steps of: a) forming a first compartment (as described above); b) forming a recess within some or all of the closed compartment formed in step (a), to generate a second molded compartment superposed above the first compartment; c) filling and closing the second compartments by means of a third film; d) sealing the first, second and third films; and e) cutting the films to produce a multi-compartment pouch. The recess formed in step (b) may be achieved by applying a vacuum to the compartment prepared in step (a).

In some embodiments, second, and/or third compartment(s) can be made in a separate step and then combined with the first compartment as described in European Patent Application Number 08101442.5 or WO 2009/152031.

In some embodiments, pouches may be made according to a process comprising the steps of: a) forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment pouch.

The first and second forming machines may be selected based on their suitability to perform the above process. In some embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive liquid, gel or paste compositions.

In some embodiments, the film and/or pouch is sprayed or dusted with a suitable material, such as an active agent, a lubricant, an aversive agent, or mixtures thereof. In some embodiments, the film and/or pouch is printed upon, for example, with an ink and/or an active agent.

Pouch Contents

The present articles (e.g., in the form of pouches or packets) may contain various compositions, for example household care compositions. A multi-compartment pouch may contain the same or different compositions in each separate compartment. The composition is proximal to the water-soluble film. The composition may be less than about 10 cm, or less than about 5 cm, or less than about 1 cm from the film. Typically the composition is adjacent to the film or in contact with the film. The film may be in the form of a pouch or a compartment, containing the composition therein.

As described above, the film and pouch are particularly advantageous for packaging (e.g., in direct contact with)

materials which have exchangeable hydrogen ions, for example compositions characterized by acid/base equilibria, such as amine-fatty acid equilibria and/or amine-anionic surfactant acid equilibria.

This feature of the disclosure may be utilized to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in European Patent Application Number 09161692.0.

Non-limiting examples of useful compositions (e.g., household care compositions) include light duty and heavy duty liquid detergent compositions, hard surface cleaning compositions, detergent gels commonly used for laundry, bleach and laundry additives, fabric enhancer compositions (such as fabric softeners), shampoos, body washes, and other personal care compositions. Compositions of use in the present pouches may take the form of a liquid, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

The compositions encapsulated by the films described herein can have any suitable viscosity depending on factors such as formulated ingredients and purpose of the composition. In one embodiment, the composition has a high shear viscosity value, at a shear rate of 20 $s^{-1}$ and a temperature of 20° C., of 100 to 3,000 cP, alternatively 300 to 2,000 cP, alternatively 500 to 1,000 cP, and a low shear viscosity value, at a shear rate of 1 $s^{-1}$ and a temperature of 20° C., of 500 to 100,000 cP, alternatively 1000 to 10,000 cP, alternatively 1,300 to 5,000 cP. Methods to measure viscosity are known in the art. According to the present invention viscosity measurements are carried out using a rotational rheometer e.g. TA instruments AR550. The instrument includes a 40 mm 2° or 1° cone fixture with a gap of around 50-60 μm for isotropic liquids, or a 40 mm flat steel plate with a gap of 1000 μm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 $s^{-1}$, and an equilibration of 60 seconds at the selected temperature. The peak hold involves applying a shear rate of 0.05 $s^{-1}$ at 20° C. for 3 min with sampling every 10 s. The continuous ramp step is performed at a shear rate from 0.1 to 1200 $s^{-1}$ for 3 min at 20° C. to obtain the full flow profile.

In pouches or other articles comprising laundry, laundry additive and/or fabric enhancer compositions, the compositions may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume and/or perfume microcapsules (see for example U.S. Pat. No. 5,137,646); perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors (see: U.S. Publication No. 2003/0060390 A1, ¶ 65-77); cationic starches (see: US 2004/0204337 A1 and US 2007/0219111 A1); scum dispersants (see: US 2003/0126282 A1, ¶89-90); substantive dyes; hueing dyes (see: US 2014/0162929A1); colorants; opacifier; antioxidant; hydrotropes such as toluenesulfonates, cumenesulfonates and naphthalenesulfonates; color speckles; colored beads, spheres or extrudates; clay softening agents; antibacterial agents. Any one or more of these ingredients is further described in described in European Patent Application Number 09161692.0, U.S. Publication Number 2003/0139312A1 and U.S. Patent Application No. 61/229,981. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Surfactants

The detergent compositions can comprise from about 1% to 80% by weight of a surfactant. Surfactant is particularly preferred as a component of the first composition. Preferably, the first composition comprises from about 5% to 50% by weight of surfactant. The second and third compositions may comprise surfactant at levels of from 0.1 to 99.9%.

Detersive surfactants utilized can be of the anionic, nonionic, zwitterionic, ampholytic or cationic type or can comprise compatible mixtures of these types. More preferably surfactants are selected from the group consisting of anionic, nonionic, cationic surfactants and mixtures thereof. Preferably the compositions are substantially free of betaine surfactants. Detergent surfactants useful herein are described in U.S. Pat. Nos. 3,664,961; 3,919,678; 4,222,905; and 4,239,659. Anionic and nonionic surfactants are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants include: a) the sodium, potassium and ammonium alkyl sulfates, especially those obtained by sulfating the higher alcohols ($C_8$-$C_{18}$) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$ LAS.

Anionic surfactants of the present invention and adjunct anionic cosurfactants, may exist in an acid form, and said acid form may be neutralized to form a surfactant salt which is desirable for use in the present detergent compositions. Typical agents for neutralization include the metal counterion base such as hydroxides, e.g., NaOH or KOH. Further preferred agents for neutralizing anionic surfactants of the present invention and adjunct anionic surfactants or cosurfactants in their acid forms include ammonia, amines, or alkanolamines. Alkanolamines are preferred. Suitable non-limiting examples including monoethanolamine, diethanolamine, triethanolamine, and other linear or branched alkanolamines known in the art; for example, highly preferred alkanolamines include 2-amino-1-propanol, 1-aminopropanol, monoisopropanolamine, or 1-amino-3-propanol. Amine neutralization may be done to a full or partial extent, e.g. part of the anionic surfactant mix may be neutralized with sodium or potassium and part of the anionic surfactant mix may be neutralized with amines or alkanolamines.

Preferred nonionic surfactants are those of the formula $R_1(OC_2H_4)_nOH$, wherein $R_1$ is a $C_{10}$-$C_{16}$ alkyl group or a $C_8$-$C_{12}$ alkyl phenyl group, and n is from 3 to about 80. Particularly preferred are condensation products of $C_{12}$-$C_{15}$ alcohols with from about 5 to about 20 moles of ethylene oxide per mole of alcohol, e.g., $C_{12}$-$C_{13}$ alcohol condensed with about 6.5 moles of ethylene oxide per mole of alcohol.

Solvent System

The solvent system in the present compositions can be a solvent system containing water alone or mixtures of organic solvents with water. Preferred organic solvents include glycerol, ethylene glycol, 1,3 propanediol, 1,2 propanediol, tetramethylene glycol, pentamethylene glycol, hexamethylene glycol, 2,3-butane diol, 1,3 butanediol, diethylene glycol, triethylene glycol, polyethylene glycol, glycerol formal dipropylene glycol, polypropylene glycol, dipropylene glycol n-butyl ether, and mixtures thereof, more preferably 1,2-propanediol, ethanol, glycerol, dipropylene glycol, methyl propane diol and mixtures thereof. Other lower alcohols, $C_1$-$C_4$ alkanolamines such as monoethanolamine and triethanolamine, can also be used. Solvent systems can be absent, for example from anhydrous solid embodiments of the disclosure, but more typically are present at levels in the range of from about 0.1% to about 98%, preferably at least about 1% to about 50%, more usually from about 5% to about 25%. Typically, the present compositions, particularly when in liquid form, comprise less than 50% water, preferably from about 0.1% to about 20% water, or more preferably from about 0.5% to about 15%, or from about 5% to about 12%, by weight of the composition, of water.

The compositions herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

The pH of the useful compositions may be from about 2 to about 12, about 4 to about 12, about 5.5 to about 9.5, about 6 to about 8.5, or about 6.5 to about 8.2. Laundry detergent compositions may have a pH of about 6 to about 10, about 6.5 to about 8.5, about 7 to about 7.5, or about 8 to about 10. Auto-dishwashing compositions may have a pH of about 8 to about 12. Laundry detergent additive compositions may have a pH of about 4 to about 8. Fabric enhancers may have a pH of from about 2 or 4 to about 8, or from about 2 to about 4, or from about 2.5 to about 3.5, or from about 2.7 to about 3.3.

The pH of the detergent is defined as the pH of an aqueous 10% (weight/volume) solution of the detergent at 20±2° C.; for solids and powdered detergent this is defined as the pH of an aqueous 1% (weight/volume) solution of the detergent at 20±2° C. Any meter capable of measuring pH to ±0.01 pH units is suitable. Orion meters (Thermo Scientific, Clintinpark-Keppekouter, Ninovesteenweg 198, 9320 Erembodegem-Aalst, Belgium) or equivalent are acceptable instruments. The pH meter should be equipped with a suitable glass electrode with calomel or silver/silver chloride reference. An example includes Mettler DB 115. The electrode shall be stored in the manufacturer's recommended electrolyte solution.

The 10% aqueous solution of the detergent is prepared according to the following procedure. A sample of 10±0.05 grams is weighted with a balance capable of accurately measuring to ±0.02 grams. The sample is transferred to a 100 mL volumetric flask, diluted to volume with purified water (deionized and/or distilled water are suitable as long as the conductivity of the water is <5 µS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

For solid and powdered detergents, the 1% aqueous solution of the detergent is prepared according to the following procedure. A sample of 10±0.05 grams is weighted with a balance capable of accurately measuring to ±0.02 grams. The sample is transferred to a volumetric flask of 1000 mL, diluted to volume with purified water (deionized and/or distilled water are suitable as long as the conductivity of the water is <5 µS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

Bleaches

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated as is known in the art.

Alkali metal percarbonates, particularly sodium percarbonate are preferred perhydrates for use in the detergent composition described herein. The percarbonate is most preferably incorporated into the products in a coated form which provides in-product stability. A suitable coating material providing in product stability comprises mixed salt of a water-soluble alkali metal sulphate and carbonate. Such coatings together with coating processes have previously been described in GB1,466,799, and U.S. Pat. Nos. 3,975,280; 4,075,116; and 5,340,496, each incorporated herein by reference. The weight ratio of the mixed salt coating material to percarbonate lies in the range from 1:99 to 1:9, and preferably from 1:49 to 1:19. Preferably, the mixed salt is of sodium sulphate and sodium carbonate which has the general formula $Na_2SO_4.n.Na_2CO_3$ wherein n is from 0.1 to 3, preferably from 0.3 to 1.0, and more preferably from 0.2 to 0.5. Another suitable coating material providing in product stability comprises sodium silicate of $SiO_2$: $Na_2O$ ratio from 1.8:1 to 3.0:1, preferably 1.8:1 to 2.4:1, and/or sodium metasilicate, preferably applied at a level of from 2% to 10%, (normally from 3% to 5%) of $SiO_2$ by weight of the inorganic perhydrate salt, such as potassium peroxymonopersulfate. Other coatings which contain magnesium silicate, silicate and borate salts, silicate and boric acids, waxes, oils, and fatty soaps can also be used advantageously Organic bleaches can include organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. The diacyl peroxide, especially dibenzoyl peroxide, preferably can be present in the form of particles having a weight average diameter of from about 0.1 to about 100 microns, preferably from about 0.5 to about 30 microns, more preferably from about 1 to about 10 microns. Preferably, at least about 25% to 100%, more preferably at least about 50%, even more preferably at least about 75%, most preferably at least about 90%, of the particles are smaller than 10 microns, preferably smaller than 6 microns.

Other organic bleaches include the peroxy acids, particular examples being the alkylperoxy acids and the arylperoxy acids. Preferred representatives are: (a) peroxybenzoic acid and its ring-substituted derivatives, such as alkylperoxybenzoic acids, but also peroxy-α-naphthoic acid and magnesium monoperphthalate; (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates; and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi(6-aminopercaproic acid)

Bleach activators can include organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

Bleach catalysts preferred for use in the detergent composition herein include the manganese triazacyclononane and related complexes (U.S. Pat. Nos. 4,246,612, 5,227,084); Co, Cu, Mn and Fe bispyridylamine and related complexes (U.S. Pat. No. 5,114,611); and pentamine acetate cobalt(III) and related complexes (U.S. Pat. No. 4,810,410). A complete description of bleach catalysts suitable for use herein can be found in U.S. Pat. No. 6,599,871, incorporated herein by reference.

Dishwashing Agents

A preferred surfactant for use in automatic dishwashing detergents is low foaming by itself or in combination with other components (e.g. suds suppressers). Preferred for use herein are low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's POLY-TERGENT® SLF18), epoxy-capped poly (oxyalkylated) alcohols (e.g., Olin Corporation's POLY-TERGENT® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASF-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants suitable for use herein are disclosed, for example, in U.S. Pat. Nos. 3,929,678, 4,259,217, EP-A-0414 549, WO-A-93/08876 and WO-A-93/08874. Surfactants can be present at a level of from about 0.2% to about 30% by weight, more preferably from about 0.5% to about 10% by weight, most preferably from about 1% to about 5% by weight of a detergent composition.

Other Compositions and Additives

Builders suitable for use in the detergent composition described herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

The household care composition may comprise an enzyme. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a household care composition, the aforementioned additional enzymes may be present at levels from about 0.00001% to about 2%, from about 0.0001% to about 1% or even from about 0.001% to about 0.5% enzyme protein by weight of the composition.

Enzymes suitable for use in the detergent composition described herein include bacterial and fungal cellulases including CAREZYME and CELLUZYME (Novo Nordisk A/S); peroxidases; lipases including AMANO-P (Amano Pharmaceutical Co.), M1 LIPASE and LIPOMAX (Gist-Brocades) and LIPOLASE and LIPOLASE ULTRA (Novo); cutinases; proteases including ESPERASE, ALCALASE, DURAZYM and SAVINASE (Novo) and MAXATASE, MAXACAL, PROPERASE and MAXAPEM (Gist-Brocades); α and β amylases including PURAFECT OX AM (Genencor) and TERMAMYL, BAN, FUNGAMYL, DURAMYL, and NATALASE (Novo); pectinases; and mixtures thereof. Enzymes can be added herein as prills, granulates, or cogranulates at levels typically in the range from about 0.0001% to about 2% pure enzyme by weight of the cleaning composition.

Enzymes for use in household care compositions can be stabilized by various techniques. The enzymes employed herein can be stabilized by the presence of water-soluble sources of calcium and/or magnesium ions in the finished fabric and home care products that provide such ions to the enzymes. In case of aqueous consumer products comprising protease, a reversible protease inhibitor, such as peptide aldehydes or a boron compound including borate, 4-formyl phenylboronic acid, phenylboronic acid and derivatives thereof, or compounds such as calcium formate, sodium formate and 1,2-propane diol can be added to further improve stability.

The composition may comprise a fabric hueing agent. Suitable fabric hueing agents include dyes, dye-clay conjugates, and pigments. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof. Preferred dyes include alkoxylated azothiophenes, Solvent Violet 13, Acid Violet 50 and Direct Violet 9.

The composition may comprise an encapsulate. In one aspect, an encapsulate comprising a core, a shell having an inner and outer surface, said shell encapsulating said core. The core may comprise perfume. The shell may comprise melamine formaldehyde and/or cross linked melamine formaldehyde. The shell may comprise a polyacrylate polymer.

Suitable encapsulates may comprise a core material and a shell, said shell at least partially surrounding said core material. At least 75%, 85% or even 90% of said encapsulates may have a fracture strength of from about 0.2 MPa to about 10 MPa, from about 0.4 MPa to about 5 MPa, from about 0.6 MPa to about 3.5 MPa, or even from about 0.7 MPa to about 3 MPa; and a benefit agent leakage of from 0% to about 30%, from 0% to about 20%, or even from 0% to about 5%. In one aspect, at least 75%, 85% or even 90% of said encapsulates may have a particle size of from about 1 microns to about 80 microns, about 5 microns to 60 microns, from about 10 microns to about 50 microns, or even from about 15 microns to about 40 microns. In one aspect, at least 75%, 85% or even 90% of said encapsulates may have a particle wall thickness of from about 30 nm to about 250 nm, from about 80 nm to about 180 nm, or even from about 100 nm to about 160 nm.

In one aspect, said encapsulates' core material may comprise a material selected from the group consisting of a perfume raw material and/or optionally a material selected from the group consisting of vegetable oil, including neat and/or blended vegetable oils including castor oil, coconut oil, cottonseed oil, grape oil, rapeseed, soybean oil, corn oil, palm oil, linseed oil, safflower oil, olive oil, peanut oil, coconut oil, palm kernel oil, castor oil, lemon oil and mixtures thereof; esters of vegetable oils, esters, including dibutyl adipate, dibutyl phthalate, butyl benzyl adipate, benzyl octyl adipate, tricresyl phosphate, trioctyl phosphate and mixtures thereof; straight or branched chain hydrocarbons, including those straight or branched chain hydrocarbons having a boiling point of greater than about 80° C.; partially hydrogenated terphenyls, dialkyl phthalates, alkyl biphenyls, including monoisopropylbiphenyl, alkylated naphthalene, including dipropylnaphthalene, petroleum spirits, including kerosene, mineral oil and mixtures thereof; aromatic solvents, including benzene, toluene and mixtures thereof; silicone oils; and mixtures thereof.

The composition can also comprise a deposition aid, preferably consisting of the group comprising cationic or nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or monomers selected from the group comprising acrylic acid and acrylamide.

Suds suppressers suitable for use in the detergent composition described herein include nonionic surfactants having a low cloud point. "Cloud point" as used herein, is a well known property of nonionic surfactants which is the result of the surfactant becoming less soluble with increasing temperature, the temperature at which the appearance of a second phase is observable is referred to as the "cloud point." As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF POLY-TERGENT SLF18) and epoxy-capped poly(oxyalkylated) alcohols (e.g., BASF POLY-TERGENT SLF18B series of nonionics, as described, for example, in U.S. Pat. No. 5,576,281).

Other suitable components for use in the detergent or household care composition described herein include cleaning polymers having anti-redeposition, soil release or other detergency properties. Anti-redeposition polymers for use herein include acrylic acid containing polymers such as SOKALAN PA30, PA20, PA15, PA10 and SOKALAN CP10 (BASF GmbH), ACUSOL 45N, 480N, 460N (Rohm and Haas), acrylic acid/maleic acid copolymers such as SOKALAN CP5, and acrylic/methacrylic copolymers. The household care composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers of the present invention comprise a core structure and a plurality of alkoxylate groups attached to that core structure. Suitable polymers include amine-based polymers such as alkoxylated polyalkyleneimines (e.g., PEI600 EO20 and/or ethoxysulfated hexamethylene diamine dimethyl quats), which, optionally, may be quaternized. Other polymers include alkoxylated polyalkylenimines that have an inner polyethylene oxide block and an outer polypropylene oxide block. Other suitable polymers include amine-based polymers such as alkoxylated polyalkyleneimines (e.g., PEI600 EO20 and/or ethoxysulfated hexamethylene diamine dimethyl quats), which, optionally, may be quaternized. Soil release polymers for use herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

Structured liquids can either be internally structured, whereby the structure is formed by primary ingredients (e.g. surfactant material) and/or externally structured by providing a three dimensional matrix structure using secondary ingredients (e.g. polymers, clay and/or silicate material). The composition may comprise a structurant, preferably from 0.01 wt % to 5 wt %, from 0.1 wt % to 2.0 wt % structurant. The structurant is typically selected from the group consisting of diglycerides and triglycerides, ethylene glycol distearate, microcrystalline cellulose, cellulose-based materials, microfiber cellulose, hydrophobically modified alkali-swellable emulsions such as Polygel W30 (3VSigma), biopolymers, xanthan gum, gellan gum, and mixtures thereof. A suitable structurant includes hydrogenated castor oil, and non-ethoxylated derivatives thereof. A suitable structurant is disclosed in U.S. Pat. No. 6,855,680. Such structurants have a thread-like structuring system having a range of aspect ratios. Other suitable structurants and the processes for making them are described in WO2010/034736.

Heavy metal sequestrants and crystal growth inhibitors are also suitable for use in the detergent, for example diethylenetriamine penta(methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG 70 sold by Wintershall, Salzbergen, Germany), nitrogen-containing corrosion inhibitor compounds (for example benzotriazole and benzimadazole—see GB-A-1137741) and Mn(II) compounds, particularly Mn(II) salts of organic ligands.

Other suitable components for use in the detergent composition herein include enzyme stabilizers, for example calcium ion, boric acid and propylene glycol.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process. European Patent 0 197 434 B1 describes rinse aids which contain mixed ethers as surfactants. Rinse additives such as fabric softeners and the like are also contemplated and suitable for encapsulation in a film according to the disclosure herein.

Methods of Use

The films and articles described herein, as well as compositions contained therein, may be used to treat a substrate, e.g., fabric or a hard surface, for example by contacting the substrate with the film, article, and/or composition contained therein. The contacting step may occur manually or in an automatic machine, e.g., an automatic (top or front-loading) laundry machine or an automatic dishwashing machine. The contacting step may occur in the presence of water, which may be at a temperature up to about 80° C., or up to about 60° C., or up to about 40° C., or up to about 30° C., or up to about 20° C., or up to about 15° C., or up to about 10° C., or up to about 5° C. As noted above, the present films and articles made therefrom are particularly suited for cold water dissolution and therefore provide benefits in cold-water washes (e.g., from about 1° C. to about 30° C., or from about 5° C. to about 20° C.). The contacting step may be followed by a multi-rinse cycle or even by a single rinse cycle; because the film has good dissolution properties, less water is required to dissolve the film and/or release the contents contained therein.

Specific contemplated aspects of the disclosure are herein described in the following numbered paragraphs.

1. A water-soluble film comprising: a polyvinyl alcohol (PVOH) resin blend comprising: a first PVOH copolymer comprising an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$); wherein: an absolute viscosity difference $|\mu_2-\mu_1|$ for the first PVOH copolymer and the second PVOH polymer is in a range of 0 cP to about 10 cP, and the first PVOH copolymer is present in an amount in a range of about 30 wt. % to about 90 wt. % of total PVOH polymers and PVOH copolymers in the film.

2. The water-soluble film of paragraph 1, wherein the second PVOH polymer is present in an amount in a range of about 10 wt. % to about 70 wt. % of total PVOH polymers and PVOH copolymers in the film.

3. The water-soluble film of any of paragraphs 1 or 2, wherein the anionic monomer unit is present in the film in an amount in a range of about 1.0 mol. % to about 4.2 mol. % of total PVOH polymers and PVOH copolymers in the film.

4. A water-soluble film comprising: a polyvinyl alcohol (PVOH) resin blend comprising: a first PVOH copolymer comprising an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$); wherein: an absolute viscosity difference $|\mu_2-\mu_1|$ for the first PVOH copolymer and the second PVOH polymer is in a range of 0 cP to about 10 cP, and the anionic monomer unit is present in the film in an amount in a range of about 1.0 mol. % to about 4.2 mol. % of total PVOH polymers and PVOH copolymers in the film.

5. The water-soluble film of any of the preceding paragraphs, wherein the anionic monomer is selected from the group consisting of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2- methylpropanesulfonic acid, 2-sufoethyl acrylate, alkali metal salts of the foregoing, esters of the foregoing, and combinations thereof.

6. The water-soluble film of any of the preceding paragraphs, wherein the anionic monomer is selected from the group consisting of acrylamido methylpropanesulfonic acids, alkali metal salts thereof, and combinations thereof.

7. The water-soluble film of any of the preceding paragraphs, wherein the anionic monomer is selected from the group consisting of monomethyl maleate, alkali metal salts thereof, and combinations thereof.

8. The water-soluble film of any of the preceding paragraphs, wherein the anionic monomer unit is present in first PVOH copolymer in an amount in a range of about 2 mol. % to about 10 mol. %.

9. The water-soluble film of paragraph 8, wherein the anionic monomer unit is present in first PVOH copolymer in an amount in a range of about 5 mol. % to about 10 mol. %.

10. The water-soluble film of paragraph 9, wherein the anionic monomer unit is present in an amount in a range of about 3 mol. % to about 4.2 mol. % of total PVOH polymers and PVOH copolymers in the film.

11. The water-soluble film of any of the preceding paragraphs, wherein the PVOH resin blend consists essentially of the first PVOH copolymer and the second PVOH polymer.

12. The water-soluble film of any of the preceding paragraphs, wherein a viscosity difference ($\mu_2-\mu_1$) for the first PVOH copolymer and the second PVOH polymer is in a range from about 0 cP to about 10 cP.

13. The water-soluble film of any of the preceding paragraphs, wherein the first viscosity $\mu_1$ is in a range of about 4 cP to about 24 cP.

14. The water-soluble film of any of the preceding paragraphs, wherein the second viscosity $\mu_2$ is in a range of about 4 cP to about 24 cP.

15. The water-soluble film of any of the preceding paragraphs, wherein the water-soluble film has a residue value of about 45 wt. % or less as measured by the Dissolution Chamber Test.

16. The water-soluble film of any of the preceding paragraphs, wherein the first PVOH copolymer and the second PVOH polymer each independently have a degree of hydrolysis in a range of about 75% to about 99%.

17. The water-soluble film of any of the preceding paragraphs, wherein the PVOH resin blend comprises a third PVOH polymer.

18. The water-soluble film of any of the preceding paragraphs, wherein the water-soluble film further comprises at least a third water-soluble polymer which is other than a PVOH polymer.

19. The water-soluble film of paragraph 18, wherein the water-soluble polymer is selected from the group consisting of polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethylcelluloses and salts thereof, dextrins, ethylcelluloses, hydroxyethyl celluloses, hydroxypropyl methylcelluloses, maltodextrins, starches, modified starches, guar gum, gum Acacia, xanthan gum, carrageenan, polyacrylates and salts thereof, copolymers thereof, blends thereof, and combinations thereof.

20. The water-soluble film of any of the preceding paragraphs, wherein the water-soluble film further comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, surfactants, and combinations thereof.

21. The water-soluble film of any of the preceding paragraphs, wherein the water-soluble film further comprises one or more plasticizers in an amount in a range of about 1 wt. % to about 40 wt. % of the film.

22. A water-soluble film comprising: a polyvinyl alcohol (PVOH) resin blend comprising: a first PVOH copolymer comprising an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$) of about 20 cP or less; wherein: the first PVOH copolymer is present in an amount in a range of about 30 wt. % to about 90 wt. % of total PVOH polymers and copolymers in the film (e.g., where the water-soluble film or component thereof can incorporate any of the refinements from the preceding paragraphs).

23. A water-soluble film comprising: a polyvinyl alcohol (PVOH) resin blend comprising: a first PVOH copolymer comprising an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$) of about 20 cP or less; wherein: the anionic monomer unit is present in the film in an amount in a range of about 1.0 mol. % to about 4.2 mol. % of total PVOH polymers and PVOH copolymers in the film (e.g., where the water-soluble film or component thereof can incorporate any of the refinements from the preceding paragraphs).

24. A water-soluble film comprising: a polyvinyl alcohol (PVOH) resin blend comprising: a first PVOH copolymer comprising a first anionic monomer unit; and a second PVOH polymer consisting essentially of vinyl alcohol monomer units and optionally vinyl acetate monomer units; wherein the first PVOH copolymer is present in an amount in a range of about 30 wt. % to about 70 wt. % of total PVOH polymers and PVOH copolymers in the film.

25. The water-soluble film of paragraph 24, wherein the second PVOH polymer is present in an amount in a range of about 30 wt. % to about 70 wt. % of total PVOH polymers and PVOH copolymers in the film.

26. The water-soluble film of paragraph 24 or 25, wherein the first anionic monomer is selected from the group consisting of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing, esters of the foregoing, and combinations thereof.

27. The water-soluble film of any of paragraphs 24 to 26, wherein the first anionic monomer is selected from the group consisting of acrylamido methylpropanesulfonic acids, alkali metal salts thereof, and combinations thereof.

28. The water-soluble film of any of paragraphs 24 to 27, wherein the first anionic monomer is present in an amount less than about 3 mol. % of total PVOH polymers and PVOH copolymers in the film.

29. The water-soluble film of any of paragraphs 24 to 28, wherein the first PVOH copolymer and the second PVOH polymer have 4% solution viscosity values at 20° C. that are within about 10 cP of each other.

30. The water-soluble film of any of paragraphs 24 to 29, wherein the first PVOH copolymer and the second PVOH polymer have 4% solution viscosity values at 20° C. that are more than about 10 cP apart from each other.

31. The water-soluble film of any of paragraphs 24 to 30, wherein: the first PVOH copolymer has a level of incorporation of the first anionic monomer unit in a range of about 3 mol. % to about 5 mol. %; the first anionic monomer is selected from the group consisting of acrylamido methylpropanesulfonic acids, alkali metal salts thereof, and combinations thereof; the first anionic monomer is present in an amount in a range of about 1 mol. % to about 3 mol. % of total PVOH polymers and PVOH copolymers in the film; the first PVOH copolymer is present in an amount in a range from about 40 wt. % to about 60 wt. % of total PVOH polymers and PVOH copolymers in the film; the second PVOH polymer has a 4% solution viscosity value at 20° C. in a range of about 8 cP to about 16 cP; and the second PVOH polymer is present in an amount in a range from about 40 wt. % to about 60 wt. % of total PVOH polymers and PVOH copolymers in the film.

32. The water-soluble film of any of paragraphs 24 to 30, wherein: the first PVOH copolymer has a level of incorporation of the first anionic monomer unit in a range of about 3 mol. % to about 5 mol. %; the first anionic monomer is selected from the group consisting of acrylamido methylpropanesulfonic acids, alkali metal salts thereof, and combinations thereof; the first anionic monomer is present in an amount in a range of about 1 mol. % to about 3 mol. % of total PVOH polymers and PVOH copolymers in the film; the first PVOH copolymer is present in an amount in a range from about 30 wt. % to about 70 wt. % of total PVOH polymers and PVOH copolymers in the film; the second PVOH polymer has a 4% solution viscosity value at 20° C. in a range of about 20 cP to about 30 cP; and the second PVOH polymer is present in an amount in a range from about 30 wt. % to about 70 wt. % of total PVOH polymers and PVOH copolymers in the film.

33. The water-soluble film of any of paragraphs 24 to 32, wherein the water-soluble film has a residue value of about 48 wt. % or less as measured by the Dissolution Chamber Test.

34. The water-soluble film of any of paragraphs 24 to 33, wherein the water-soluble film has an average tensile strength value of at least about 33 MPa as measured by the Tensile Strength Test.

35. The water-soluble film of any of paragraphs 24 to 34, wherein the water-soluble film has a modulus value of at least about 12 N/mm$^2$ as measured by the Modulus Test.

36. An article comprising: a water-soluble film of any of the preceding paragraphs in the form of a pouch defining an interior pouch volume.

37. The article of paragraph 24, further comprising a composition contained in the interior pouch volume.

38. An article comprising: a water-soluble film of any of the preceding paragraphs and a household care composition proximal to the film.

1A. An article comprising a water-soluble film and a household care composition proximal to the film, where the film comprises: a polyvinyl alcohol (PVOH) resin blend comprising: a first PVOH copolymer comprising an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$); wherein: an absolute viscosity difference $|\mu_2-\mu_1|$ for the first PVOH copolymer and the second PVOH polymer is in a range of 0 cP to about 10 cP, and the first PVOH copolymer is present in an amount in a range of about 30 wt. % to about 90 wt. % of total PVOH polymers and PVOH copolymers in the film.

2A. The article of paragraph 1A, wherein the second PVOH polymer is present in an amount in a range of about 10 wt. % to about 70 wt. % of total PVOH polymers and PVOH copolymers in the film.

3A. The article of any of paragraphs 1A or 2A, wherein the anionic monomer unit is present in the film in an amount in a range of about 1.0 mol. % to about 4.2 mol. % of total PVOH polymers and PVOH copolymers in the film.

4A. An article comprising a water-soluble film and a household care composition, where the film comprises: a polyvinyl alcohol (PVOH) resin blend comprising: a first PVOH copolymer comprising an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$); wherein: an absolute viscosity difference $|\mu_2-\mu_1|$ for the first PVOH copolymer and the second PVOH polymer is in a range of 0 cP to about 10 cP, and the anionic monomer unit is present in the film in an amount in a range of about 1.0 mol. % to about 4.2 mol. % of total PVOH polymers and PVOH copolymers in the film.

5A. The article of any of the preceding paragraphs, wherein the anionic monomer is selected from the group consisting of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing, esters of the foregoing, and combinations thereof.

6A. The article of any of the preceding paragraphs, wherein the anionic monomer is selected from the group consisting of acrylamido methylpropanesulfonic acids, alkali metal salts thereof, and combinations thereof.

7A. The article of any of the preceding paragraphs, wherein the anionic monomer is selected from the group consisting of monomethyl maleate, alkali metal salts thereof, and combinations thereof.

8A. The article of any of the preceding paragraphs, wherein the anionic monomer unit is present in first PVOH copolymer in an amount in a range of about 2 mol. % to about 10 mol. %.

9A. The article of paragraph 8A, wherein the anionic monomer unit is present in first PVOH copolymer in an amount in a range of about 5 mol. % to about 10 mol. %.

10A. The article of paragraph 9A, wherein the anionic monomer unit is present in an amount in a range of about 3 mol. % to about 4.2 mol. % of total PVOH polymers and PVOH copolymers in the film.

11A. The article of any of the preceding paragraphs, wherein the PVOH resin blend consists essentially of the first PVOH copolymer and the second PVOH polymer.

12A. The article of any of the preceding paragraphs, wherein a viscosity difference ($\mu_2-\mu_1$) for the first PVOH copolymer and the second PVOH polymer is in a range from about 0 cP to about 10 cP.

13A. The article of any of the preceding paragraphs, wherein the first viscosity $\mu_1$ is in a range of about 4 cP to about 24 cP.

14A. The article of any of the preceding paragraphs, wherein the second viscosity $\mu_2$ is in a range of about 4 cP to about 24 cP.

15A. The article of any of the preceding paragraphs, wherein the water-soluble film has a residue value of about 45 wt. % or less as measured by the Dissolution Chamber Test.

16A. The article of any of the preceding paragraphs, wherein the first PVOH copolymer and the second PVOH polymer each independently have a degree of hydrolysis in a range of about 75% to about 99%.

17A. The article of any of the preceding paragraphs, wherein the PVOH resin blend comprises a third PVOH polymer.

18A. The article of any of the preceding paragraphs, wherein the water-soluble film further comprises at least a third water-soluble polymer which is other than a PVOH polymer.

19A. The article of paragraph 18A, wherein the water-soluble polymer is selected from the group consisting of polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethylcelluloses and salts thereof, dextrins, ethylcelluloses, hydroxyethyl celluloses, hydroxypropyl methylcelluloses, maltodextrins, starches, modified starches, guar gum, gum Acacia, xanthan gum, carrageenan, polyacrylates and salts thereof, copolymers thereof, blends thereof, and combinations thereof.

20A. The article of any of the preceding paragraphs, wherein the water-soluble film further comprises one or more components selected from the group consisting of plasticizers, plasticizer compatibilizers, lubricants, release agents, fillers, extenders, cross-linking agents, antiblocking agents, antioxidants, detackifying agents, antifoams, nano-particles, bleaching agents, surfactants, and combinations thereof.

21A. The water-soluble film of any of the preceding paragraphs, wherein the water-soluble film further comprises one or more plasticizers in an amount in a range of about 1 wt. % to about 40 wt. % of the film.

22A. An article comprising water-soluble film and a household care composition proximal to the film, where the film comprises: a polyvinyl alcohol (PVOH) resin blend comprising: a first PVOH copolymer comprising an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$) of about 20 cP or less; wherein: the first PVOH copolymer is present in an amount in a range of about 30 wt. % to about 90 wt. % of total PVOH polymers and copolymers in the film (e.g., where the water-soluble film or component thereof can incorporate any of the refinements from the preceding paragraphs).

23A. An article comprising water-soluble film and a household care composition proximal to the film, where the film comprises: a polyvinyl alcohol (PVOH) resin blend comprising: a first PVOH copolymer comprising an anionic monomer unit, the first PVOH copolymer having a first 4% solution viscosity at 20° C. ($\mu_1$); and a second PVOH polymer consisting essentially of vinyl alcohol monomer units and optionally vinyl acetate monomer units, the second PVOH polymer having a second 4% solution viscosity at 20° C. ($\mu_2$) of about 20 cP or less; wherein: the anionic monomer unit is present in the film in an amount in a range of about 1.2 mol. % to about 4.2 mol. % of total PVOH polymers and PVOH copolymers in the film (e.g., where the water-soluble film or component thereof can incorporate any of the refinements from the preceding paragraphs).

24A. An article comprising water-soluble film and a household care composition proximal to the film, where the film comprises: a polyvinyl alcohol (PVOH) resin blend comprising: a first PVOH copolymer comprising a first anionic monomer unit; and a second PVOH polymer consisting essentially of vinyl alcohol monomer units and optionally vinyl acetate monomer units; wherein the first PVOH copolymer is present in an amount in a range of about 30 wt. % to about 70 wt. % of total PVOH polymers and PVOH copolymers in the film.

25A. The article of paragraph 24A, wherein the second PVOH polymer is present in an amount in a range of about 30 wt. % to about 70 wt. % of total PVOH polymers and PVOH copolymers in the film.

26A. The article of paragraph 24A or 25A, wherein the first anionic monomer is selected from the group consisting of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing, esters of the foregoing, and combinations thereof.

27A. The article of any of paragraphs 24A to 26A, wherein the first anionic monomer is selected from the group consisting of acrylamido methylpropanesulfonic acids, alkali metal salts thereof, and combinations thereof.

28A. The article of any of paragraphs 24A to 27A, wherein the first anionic monomer is present in an amount less than about 3 mol. % of total PVOH polymers and PVOH copolymers in the film.

29A. The article of any of paragraphs 24A to 28A, wherein the first PVOH copolymer and the second PVOH polymer have 4% solution viscosity values at 20° C. that are within about 10 cP of each other.

30A. The article of any of paragraphs 24A to 29A, wherein the first PVOH copolymer and the second PVOH polymer have 4% solution viscosity values at 20° C. that are more than about 10 cP apart from each other.

31A. The article of any of paragraphs 24A to 30A, wherein: the first PVOH copolymer has a level of incorporation of the first anionic monomer unit in a range of about 3 mol. % to about 5 mol. %; the first anionic monomer is selected from the group consisting of acrylamido methylpropanesulfonic acids, alkali metal salts thereof, and combinations thereof; the first anionic monomer is present in an amount in a range of about 1 mol. % to about 3 mol. % of total PVOH polymers and PVOH copolymers in the film; the first PVOH copolymer is present in an amount in a range from about 40 wt. % to about 60 wt. % of total PVOH polymers and PVOH copolymers in the film; the second PVOH polymer has a 4% solution viscosity value at 20° C. in a range of about 8 cP to about 16 cP; and the second PVOH polymer is present in an amount in a range from about 40 wt. % to about 60 wt. % of total PVOH polymers and PVOH copolymers in the film.

32A. The article of any of paragraphs 24A to 30A, wherein: the first PVOH copolymer has a level of incorporation of the first anionic monomer unit in a range of about 3 mol. % to about 5 mol. %; the first anionic monomer is selected from the group consisting of acrylamido methylpropanesulfonic acids, alkali metal salts thereof, and combinations thereof; the first anionic monomer is present in an amount in a range of about 1 mol. % to about 3 mol. % of total PVOH polymers and PVOH copolymers in the film; the first PVOH copolymer is present in an amount in a range from about 30 wt. % to about 70 wt. % of total PVOH polymers and PVOH copolymers in the film; the second PVOH polymer has a 4% solution viscosity value at 20° C. in a range of about 20 cP to about 30 cP; and the second PVOH polymer is present in an amount in a range from about 30 wt. % to about 70 wt. % of total PVOH polymers and PVOH copolymers in the film.

33A. The article of any of paragraphs 24A to 32A, wherein the water-soluble film has a residue value of about 48 wt. % or less as measured by the Dissolution Chamber Test.

34A. The article of any of paragraphs 24A to 33A, wherein the water-soluble film has an average tensile strength value of at least about 33 MPa as measured by the Tensile Strength Test.

35A. The article of any of paragraphs 24A to 34A, wherein the water-soluble film has a modulus value of at least about 12 N/mm$^2$ as measured by the Modulus Test.

36A. The article of any of paragraphs 1A-35A, wherein the household care composition is in contact with the film.

37A. An article of any of paragraphs 1A-36A, wherein the article is in the form of a pouch comprising at least one sealed compartment.

38A. The article of paragraph 37A, wherein the at least one compartment comprises at least one wall, wherein the at least one wall comprises the water-soluble film.

39A. The article of paragraph 37A-38A, wherein the pouch comprises at least two compartments.

40A. The article of paragraph 39A, wherein a second compartment is superposed on a first compartment.

41A. The article of paragraph 37A, wherein the pouch comprises at least three compartments.

42A. The article of paragraph 41A, wherein a second compartment and a third compartment are superposed on a first compartment.

43A. The article of any of paragraphs 37A-42A, where the household composition is contained in the at least one compartment.

44A. An article of any of paragraphs 1A-43A, wherein the household care composition is selected from the group consisting of light duty liquid detergents compositions, heavy duty liquid detergent compositions, hard surface cleaning compositions, detergent gels commonly used for laundry, bleaching compositions, laundry additives, fabric enhancer compositions, shampoos, body washes, other personal care compositions, and mixtures thereof.

45A. The article of any of paragraphs 1A-44A, wherein the composition comprises surfactant.

46A. The article of any of paragraphs 1A-45A, wherein the composition is in the form of a liquid, solid, a powder, or mixtures thereof.

47A. A method of forming an article of any of the preceding paragraphs, where the method includes the steps of: providing the film, where the film defines an interior pouch container volume; filling the container volume with a household care composition; and sealing the film to form a sealed compartment, where the sealed compartment contains the composition.

48A. A method of treating a substrate, where the method includes the step of contacting the substrate with the article of any of paragraphs 1A-46A, or compositions contained therein, typically in the presence of water.

Dissolution Chamber Residue Test

A water-soluble film characterized by or to be tested for undissolved residue according to the Dissolution Chamber (DC) Test is analyzed as follows using the following materials:
1. Beaker (4000 ml);
2. Stainless steel washers (3.5" (88.9 mm) OD, 1.875" ID (47.6 mm), 0.125" (3.18 mm) thick);
3. Styrene-butadiene rubber gaskets (3.375" (85.7 mm) OD, 1.91" ID (48.5 mm), 0.125" thick (3.18 mm));
4. Stainless steel screens (3.0" (76.2 mm) OD, 200×200 mesh, 0.0021" (0.053 mm) wire OD, 304SS stainless steel wire cloth);
5. Thermometer (0° C. to 100° C., accurate to +/−1° C.);
6. Cutting punch (1.5" (38.1 mm) diameter);
7. Timer (accurate to the nearest second);
8. Reverse osmosis (RO) water;
9. Binder clips (size #5 or equivalent);
10. Aluminum pans (2.0" (50.8 mm) OD); and
11. Sonicator.

For each film to be tested, three test specimens are cut from a selected test film having a thickness of 3.0±0.10 mil (or 76.2±2.5 μm) using the cutting punch. If cut from a film web, the specimens should be cut from areas of web evenly spaced along the transverse direction of the web. Each test specimens is then analyzed using the following procedure:
1. Weigh the film specimen and track the specimen through the test. Record the initial film weight ($F_o$).
2. Weigh a set of two sonicated, clean, and dry screens for each specimen and track them through the test. Record the initial screen weights (collectively $S_o$ for the two screens combined).
3. Assemble a specimen dissolution chamber by flatly sandwiching the film specimen between the center of the two screens, followed by the two rubber gaskets (one gasket on each side between the screen and washer), and then the two washers.
4. Secure the dissolution chamber assembly with four binder clips evenly spaced around the washers and the clips folded back.
5. Fill the beaker with 1,500 ml of reverse osmosis water at laboratory room temperature (72+/−3° F., 22+/−2° C.) and record the room temperature.
6. Set the timer to a prescribed immersion time of 5 minutes.
7. Place the dissolution chamber assembly into the beaker and immediately start the timer, inserting the dissolution chamber assembly at an approximate 45 degree entry angle into the water surface. This entry angle helps remove air bubbles from the chamber. The dissolution chamber assembly rests on the beaker bottom such that the test specimen film is positioned horizontally about 10 mm from the bottom. The four folded-back binder clips of the dissolution chamber assembly are suitable to maintain the about 10 mm film clearance from the beaker bottom, however, any other equivalent support means may be used.

8. At the prescribed elapsed prescribed immersion time of 5 minutes, slowly remove the dissolution chamber assembly from the beaker at an approximate 45 degree angle.

9. Hold the dissolution chamber assembly horizontally over the aluminum pan to catch any drips from the screens and carefully remove the binder clips, washers, and gaskets. Do not break open the sandwiched screens.

10. Place the sandwiched screens (i.e., screen/residual undissolved film/screen) over the aluminum pan and into an oven at 100° C. for 30 minutes to dry.

11. Weigh the dried set of sandwiched screens including any residual undissolved film therein. Measure and add to this dried screen weight any dried film drippings captured in and recovered from (e.g., by scraping) the pan when the dissolution chamber assembly was first removed from the beaker and during drying. Record the final sandwiched screen weight (collectively $S_f$, including the dried film drippings).

12. Calculate % residue ("DC residue") left for the film specimen: % DC residue=$100*((S_f-S_o)/F_o)$.

13. Clean the sandwiched screens by soaking them in a beaker of RO water for about 20 minutes. Then, take them apart and do a final rinse in the sonicator (turned on and filled with RO water) for at least 5 minutes or until no residue is visible on the screens.

Suitable behavior of water-soluble films according to the disclosure is marked by DC residue values of about 45 wt. % or less or about 48 wt. % or less as measured by the DC Test. In various embodiments, the water-soluble film has a DC value of at least 1, 2, 5, 10, or 20 wt. % and/or up to about 15, 20, 30, 40, 45 wt. %, or 48 wt. % (e.g., about 5 wt. % to about 48 wt. %, about 10 wt. % to about 45 wt. %, about 20 wt. % to about 45 wt. %, or about 30 wt. % to about 40 wt. %).

Tensile Strength Test and Modulus Test

A water-soluble film characterized by or to be tested for tensile strength according to the Tensile Strength (TS) Test and modulus (or tensile stress) according to the Modulus (MOD) Test is analyzed as follows. The procedure includes the determination of tensile strength and the determination of modulus at 100% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a single film sheet having a thickness of 3.0±0.15 mil (or 76.2±3.8 µm) are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine, elongated, and analyzed to determine the 100% modulus (i.e., stress required to achieve 100% film elongation) and tensile strength (i.e., stress required to break film).

Optionally, the films can be characterized by particular mechanical properties which make the films suitable for processing into articles, e.g. filmed packets.

The water-soluble films according to the disclosure can be marked by TS values of at least about 24 MPa or about 28 MPa as measured by the TS Test. Generally, higher TS values are desirable because they correspond to stronger pouch seals when the film is the limiting or weakest element of a seal. In various embodiments, the water-soluble film has a TS value of at least about 24, 26, 28, 30, 33, or 35 MPa and/or up to about 32, 34, 40, 45, or 50 MPa (e.g., about 24 MPa to about 36 MPa or about 28 MPa to about 32 MPa). Alternatively or additionally, an upper bound for a suitable TS value range can be a TS value for a corresponding water-soluble film having only a single PVOH polymer or PVOH copolymer of the PVOH polymers and PVOH copolymers in the PVOH resin blend (e.g., a corresponding single-resin film having the higher TS value).

The water-soluble films according to the disclosure can be marked by MOD values of at least about 11 N/mm$^2$ or about 12 N/mm$^2$ as measured by the MOD Test. Generally, higher MOD values are desirable because they correspond to pouches having a greater stiffness and a lower likelihood of deforming and sticking to each other when loaded on top of each other during production or in final consumer packaging. In various embodiments, the water-soluble film has a MOD value of at least about 11, 12, or 13 N/mm$^2$ and/or up to about 13, 14, 15, or 16 N/mm$^2$ (e.g., about 11 N/mm$^2$ to about 15 N/mm$^2$ or about 12 N/mm$^2$ to about 14 N/mm$^2$). Alternatively or additionally, an upper bound for a suitable MOD value range can be a MOD value for a corresponding water-soluble film having only a single PVOH polymer or PVOH copolymer of the PVOH polymers and PVOH copolymers in the PVOH resin blend (e.g., a corresponding single-resin film having the higher MOD value).

EXAMPLES

Examples 1-5

Single-Resin Films

Examples 1-5 represent water-soluble films which were formed, each including a single PVOH polymer or PVOH copolymer Resin A-E, respectively. Resins A and B were partially hydrolyzed PVOH polymers without anionic comonomers and having different 4% solution viscosities. Resin C was a partially hydrolyzed PVOH copolymer including a 1.82 mol. % level of incorporation of an anionic monomethyl maleate (sodium salt) comonomer (i.e., Resin C was a PVOH terpolymer with vinyl alcohol, vinyl acetate, and monomethyl maleate (sodium salt) monomer units). Resins D and E were partially hydrolyzed PVOH copolymers including 1.77 mol. % and 3.70 mol. % levels of incorporation, respectively, of an anionic 2-acrylamido-2-methylpropanesulfonic acid (sodium salt) comonomer (i.e., Resins D and E were PVOH terpolymers with vinyl alcohol, vinyl acetate, and 2-acrylamido-2-methylpropanesulfonic acid (sodium salt) monomer units). The films included (i) their respective resins (100 weight parts per hundred resin weight parts (phr)), (ii) glycerol plasticizer (about 20-22 phr), (iii) propylene glycol plasticizer (about 10-12 phr), (iv)

sorbitol plasticizer (about 5-6 phr), (v) a modified starch filler (about 2-4 phr), (vi) surfactants and other process aids (about 5-7 phr), and (vii) residual water (about 9-10 phr). Aqueous compositions of the foregoing were cast to form 3.0±0.15 mil (or 76.2±3.8 μm) film samples, which were tested for their DC residue values by the above method. Table 1 summarizes the resin and film properties for Examples 1-5. In Table 1, the anionic comonomer (AC) content for the films is provided on a molar basis relative to all of the polymeric resin in the film (i.e., excluding the plasticizers and the other non-resin components thereof).

TABLE 1

Resin and Film Data for Examples 1-5

| | | Resin | | | Film | |
|---|---|---|---|---|---|---|
| Example | Type | μ (cP) | DH (%) | AC (mol. %) | DC (%) | AC (mol. %) |
| 1 | A | 12.5 | 86 | 0.00 | 60.2 | 0.00 |
| 2 | B | 23.5 | 87 | 0.00 | 60.6 | 0.00 |
| 3 | C | 23.5 | 92 | 1.82 | 49.5 | 1.82 |
| 4 | D | 24.3 | 88 | 1.77 | 49.0 | 1.77 |
| 5 | E | 12.0 | 99 | 3.70 | 5.8 | 3.70 |

Figure 2:
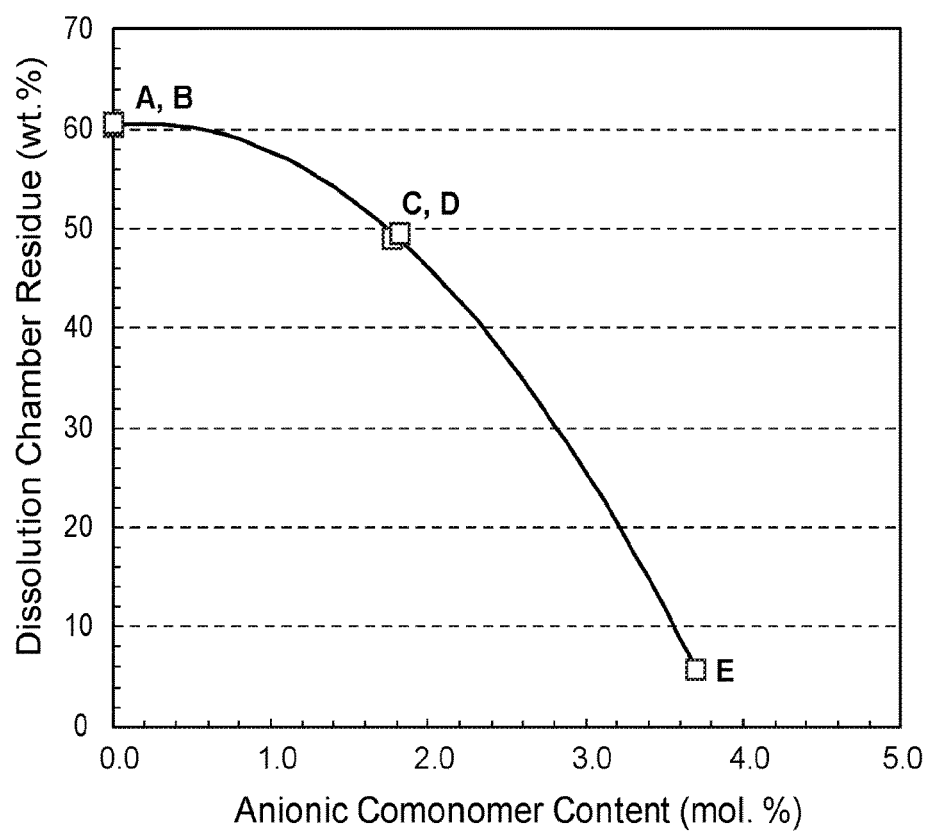
FIG. 2 is graph illustrating Dissolution Chamber Residue (wt. %) vs. Anionic Comonomer Content (mol. %) for water-soluble films including a single PVOH (co)polymer resin.

FIG. 2 presents the data from Table 1, illustrating the DC residue (wt. %) as a function of AC content (mol. %) of the PVOH (co)polymer resin forming the film. As shown, the DC residue is highly correlated with the AC content. The curved, convex shape of the DC residue (y) vs. AC context (x) relationship is illustrated in FIG. 2 with a quadratic curve ($y(x) = -4.491\ x^2 + 1.864\ x + 60.38$; $r^2 = 0.9996$) for the films tested.

Examples 6-10

Two-Resin Blend Films

Examples 6-10 represent water-soluble films which were formed, each including a blend of two of the PVOH polymer or PVOH copolymer Resins A-E. Specific blends included PVOH Resins A and E (Example 6), A and C (Example 7), A and D (Example 8), B and E (Example 9), and A and B (Example 10). The blend films included 100 phr combined of the two resins forming a given blend in a range of relative weight proportions as set forth in Tables 2-6 below, while plasticizers and other additives were present in the amounts and types as described for Examples 1-5. Aqueous compositions of the foregoing blend film compositions were cast to form 3.0±0.15 mil (or 76.2±3.8 μm) film samples, which were tested for their DC residue values, TS values, and MOD values by the above methods. Tables 2-6 summarize the resin and film properties for Examples 6-10. The first and last entries for each of Tables 2-6 represent the single-resin limit for the film formulation, while the remaining values represent the two-resin blend formulations In Tables 2-6, the anionic comonomer (AC) content for the films is provided on a molar basis relative to all of the polymeric resin in the film (i.e., including both resins present but excluding the plasticizers and the other non-resin components thereof).

TABLE 2

Resin and Film Data for Example 6 (A/E Blend)

| | | Resins | | | Film | | |
|---|---|---|---|---|---|---|---|
| Example | Type | Amt. (phr) | Type | Amt. (phr) | DC (%) | TS (MPa) | MOD (N/mm²) | AC (mol. %) |
| 6 | A | 0 | E | 100 | 7.82 | 30.47 | 13.12 | 3.70 |
| | A | 5 | E | 95 | 9.50 | 28.64 | 11.94 | 3.51 |
| | A | 10 | E | 90 | 6.38 | 24.24 | 11.01 | 3.32 |
| | A | 20 | E | 80 | 17.73 | 35.11 | 11.86 | 2.95 |
| | A | 30 | E | 70 | 11.31 | 30.38 | 11.19 | 2.58 |
| | A | 40 | E | 60 | 21.22 | 29.63 | 12.88 | 2.20 |
| | A | 45 | E | 55 | 39.05 | 28.76 | 12.15 | 2.02 |
| | A | 50 | E | 50 | 36.15 | 30.57 | 12.76 | 1.83 |
| | A | 55 | E | 45 | 42.32 | 31.83 | 14.46 | 1.65 |
| | A | 60 | E | 40 | 44.52 | 29.74 | 14.65 | 1.46 |
| | A | 70 | E | 30 | 48.66 | 35.79 | 13.77 | 1.10 |
| | A | 80 | E | 20 | 59.72 | 35.31 | 12.91 | 0.73 |
| | A | 90 | E | 10 | 62.18 | 34.61 | 11.90 | 0.36 |
| | A | 100 | E | 0 | 60.20 | 32.91 | 10.82 | 0.00 |

TABLE 3

Resin and Film Data for Example 7 (A/C Blend)

| | | Resins | | | Film | | |
|---|---|---|---|---|---|---|---|
| Example | Type | Amt. (phr) | Type | Amt. (phr) | DC (%) | TS (MPa) | MOD (N/mm²) | AC (mol. %) |
| 7 | A | 0 | C | 100 | 50.08 | 34.43 | 13.27 | 1.82 |
| | A | 30 | C | 70 | 53.59 | 32.49 | 12.73 | 1.28 |
| | A | 40 | C | 60 | 60.41 | 34.10 | 15.72 | 1.10 |
| | A | 45 | C | 55 | 58.23 | 32.19 | 14.03 | 1.01 |
| | A | 50 | C | 50 | 58.36 | 28.70 | 13.09 | 0.91 |
| | A | 55 | C | 45 | 54.85 | 32.19 | 15.17 | 0.82 |
| | A | 60 | C | 40 | 61.39 | 26.80 | 12.61 | 0.73 |
| | A | 70 | C | 30 | 56.58 | 26.79 | 12.33 | 0.55 |
| | A | 80 | C | 20 | 63.04 | 31.21 | 14.99 | 0.37 |
| | A | 90 | C | 10 | 61.40 | 30.27 | 12.07 | 0.18 |
| | A | 100 | C | 0 | 60.20 | 32.91 | 10.82 | 0.00 |

TABLE 4

Resin and Film Data for Example 8 (A/D Blend)

| | | Resins | | | Film | | |
|---|---|---|---|---|---|---|---|
| Example | Type | Amt. (phr) | Type | Amt. (phr) | DC (%) | TS (MPa) | MOD (N/mm²) | AC (mol. %) |
| 8 | A | 0 | D | 100 | 49.02 | 38.88 | 11.50 | 1.77 |
| | A | 10 | D | 90 | 52.24 | 40.27 | 11.51 | 1.59 |
| | A | 20 | D | 80 | 46.92 | 38.98 | 7.81 | 1.40 |
| | A | 30 | D | 70 | 56.20 | 35.65 | 10.46 | 1.22 |
| | A | 40 | D | 60 | 57.24 | 40.68 | 12.01 | 1.04 |
| | A | 50 | D | 50 | 55.76 | 38.68 | 12.23 | 0.87 |
| | A | 60 | D | 40 | 62.36 | 37.03 | 11.11 | 0.69 |
| | A | 70 | D | 30 | 61.24 | 38.84 | 12.34 | 0.52 |
| | A | 80 | D | 20 | 65.05 | 35.28 | 11.62 | 0.34 |
| | A | 90 | D | 10 | 63.08 | 33.69 | 10.68 | 0.17 |
| | A | 100 | D | 0 | 60.20 | 32.91 | 10.82 | 0.00 |

TABLE 5

Resin and Film Data for Example 9 (B/E Blend)

| | Resins | | | Film | | | |
|---|---|---|---|---|---|---|---|
| Example | Type | Amt. (phr) | Type | Amt. (phr) | DC (%) | TS (MPa) | MOD (N/mm$^2$) | AC (mol. %) |
| 9 | B | 0 | E | 100 | 5.78 | 28.48 | 12.66 | 3.70 |
| | B | 10 | E | 90 | 10.86 | 27.86 | 11.57 | 3.32 |
| | B | 20 | E | 80 | 27.34 | 28.87 | 12.23 | 2.94 |
| | B | 30 | E | 70 | 36.53 | 35.80 | 12.52 | 2.57 |
| | B | 40 | E | 60 | 40.61 | 34.04 | 11.71 | 2.20 |
| | B | 50 | E | 50 | 46.35 | 33.05 | 12.66 | 1.82 |
| | B | 60 | E | 40 | 52.67 | 29.22 | 14.34 | 1.46 |
| | B | 70 | E | 30 | 46.58 | 39.69 | 11.83 | 1.09 |
| | B | 80 | E | 20 | 62.65 | 27.40 | 10.20 | 0.72 |
| | B | 90 | E | 10 | 59.69 | 31.30 | 11.25 | 0.36 |
| | B | 100 | E | 0 | 60.57 | 33.44 | 12.04 | 0.00 |

TABLE 6

Resin and Film Data for Example 10 (A/B Blend)

| | Resins | | | | Film | | | |
|---|---|---|---|---|---|---|---|---|
| Example | Type | Amt. (phr) | Type | Amt. (phr) | DC (%) | TS (MPa) | MOD (N/mm$^2$) | AC (mol. %) |
| 10 | A | 100 | B | 0 | 60.20 | 32.91 | 10.82 | 0.00 |
| | A | 90 | B | 10 | 58.33 | 35.04 | 12.55 | 0.00 |
| | A | 80 | B | 20 | 62.96 | 30.26 | 9.53 | 0.00 |
| | A | 70 | B | 30 | 56.41 | 35.85 | 13.94 | 0.00 |
| | A | 60 | B | 40 | 61.34 | 36.23 | 12.41 | 0.00 |
| | A | 50 | B | 50 | 60.08 | 36.14 | 10.37 | 0.00 |
| | A | 40 | B | 60 | 65.02 | 38.17 | 12.99 | 0.00 |
| | A | 30 | B | 70 | 57.22 | 38.29 | 12.71 | 0.00 |
| | A | 20 | B | 80 | 65.17 | 36.89 | 13.26 | 0.00 |
| | A | 10 | B | 90 | 65.77 | 39.21 | 12.36 | 0.00 |
| | A | 0 | B | 100 | 60.57 | 33.44 | 12.04 | 0.00 |

Figure 3:
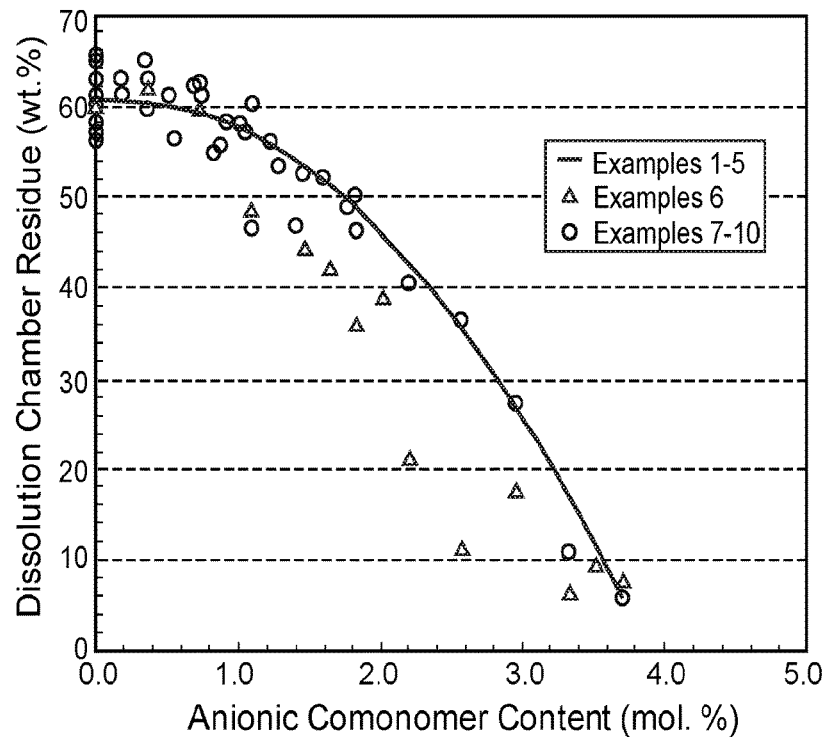
FIG. 3 is graph illustrating Dissolution Chamber Residue (wt. %) vs. Anionic Comonomer Content (mol. %) for water-soluble films including a PVOH resin blend including a PVOH copolymer and a PVOH homopolymer.
Figure 4:
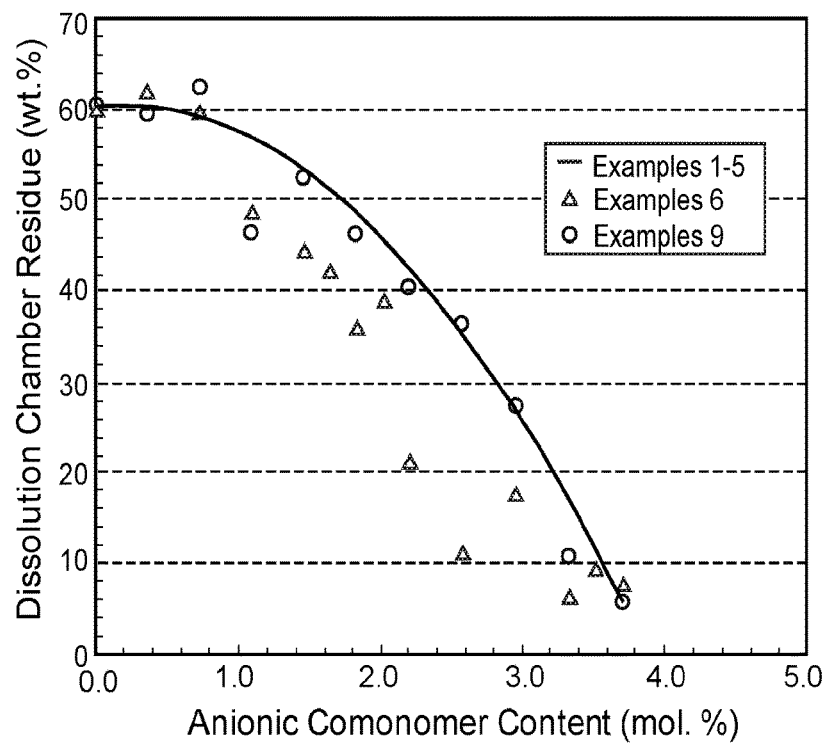
FIG. 4 is graph illustrating Dissolution Chamber Residue (wt. %) vs. Anionic Comonomer Content (mol. %) for water-soluble films including a PVOH resin blend including a PVOH copolymer and a PVOH homopolymer.

FIGS. 3 and 4 present the data from Tables 2-6, illustrating the DC residue (wt. %) as a function of AC content (mol. %) of the PVOH (co)polymer resin blend forming the film. As seen in FIG. 3, the DC residue data for Examples 7-10 generally follow the same curved, convex shape of the DC residue vs. AC content relationship illustrated in FIG. 2 for the single-polymer resin films of Examples 1-5. Relative to both the single-polymer resin films of Examples 1-5 and the two-polymer resin blend films of Examples 7-10, however, the two-polymer resin blend films of Example 6 (A/E blend) exhibit a substantially improved reduction in DC residue over wide range of blend compositions. Specifically, the A/E blend films of Example 6 demonstrate substantially reduced DC residue at AC contents ranging from about 1 mol. % to about 3.4 mol. %, especially from about 1.4 mol. % to about 2.6 mol. %. The corresponding blend compositions for the favorable films of Example 6 include about 30 wt. % to about 90 wt. % Resin E (especially about 40 wt. % to about 70 wt. % Resin E) and about 10 wt. % to about 70 wt. % Resin A (especially about 30 wt. % to about 60 wt. % Resin A).

FIG. 4, which illustrates a subset of the data in FIG. 3, provides a comparison of Example 6 (A/E blend) films with Example 9 (B/E blend) films. As seen in the graph, the Example 9 (B/E blend) films do not provide an improved DC residue performance relative to either the comparison baseline of Examples 1-5 or Examples 7-10 collectively, even though both Examples 6 and 9 span the same range of AC content values and both share the same anionic PVOH copolymer Resin E (i.e., both have the 2-acrylamido-2-methylpropanesulfonic acid (sodium salt) comonomer in the same amounts). The primary difference between Example 6 and 9 is the 4% solution viscosity of the PVOH polymer Resin A in Example 6 (about 12.5 cP) compared with that of the PVOH polymer Resin B in Example 9 (about 23.5 cP).

Comparisons of other examples similarly illustrate the advantages of the Example 6 (NE blend) films. The Example 8 (A/D blend) films share the same PVOH polymer Resin A and the same anionic comonomer as the Example 6 (A/E blend) films (i.e., both Resins D and E have the 2-acrylamido-2-methylpropanesulfonic acid (sodium salt) comonomer), yet the Example 8 (A/D blend) films do not provide an improved DC residue performance relative to the comparison baseline of either Examples 1-5 or Examples 7-10 collectively. Accordingly, the presence of 2-acrylamido-2-methylpropanesulfonic acid (sodium salt) comonomer alone does not necessarily provide improved DC residue performance. The Example 10 (A/B blend) films, which include two PVOH polymers of different viscosity (or, equivalently, molecular weight), have relatively high DC residue values. Accordingly, the relatively lower viscosity (or molecular weight) of Resin A in the Example 6 (A/E blend) films does not necessarily provide improved DC residue performance alone.

Example 11

Illustrative Compositions

Tables 7-15 show illustrative compositions that may be combined with the articles described herein. For example, the compositions below, which are intended to be non-limiting examples, may be encapsulated in the water-soluble films described herein, for example in a pouch.

A bleach additive can include the ingredients presented in Table 7.

TABLE 7

| | A Wt. % |
|---|---|
| Sodium Percarbonate | 25 |
| Bleach activator[1] | 7 |
| Sodium Carbonate | 15 |
| Sodium Citrate | 10 |
| Zeolite | 10 |
| Sodium Sulfate | 15 |
| Enzymes | 2 |
| Optical brighteners | 2 |
| Miscellaneous | To 100 |

[1]Tetraacetyl ethylene diamine

Granular laundry detergents can include the ingredients presented in Table 8.

TABLE 8

| | B (wt %) | C (wt %) | D (wt %) | E (wt %) | F (wt %) | G (wt %) |
|---|---|---|---|---|---|---|
| Linear alkylbenzenesulfonate | 8 | 7.1 | 7 | 6.5 | 7.5 | 7.5 |
| AE3S | 0 | 4.8 | 0 | 5.2 | 4 | 4 |

TABLE 8-continued

| | B (wt %) | C (wt %) | D (wt %) | E (wt %) | F (wt %) | G (wt %) |
|---|---|---|---|---|---|---|
| C12-14 Alkylsulfate | 1 | 0 | 1 | 0 | 0 | 0 |
| AE7 | 2.2 | 0 | 3.2 | 0 | 0 | 0 |
| $C_{10-12}$ Dimethyl hydroxyethylammonium chloride | 0.75 | 0.94 | 0.98 | 0.98 | 0 | 0 |
| Crystalline layered silicate (d-$Na_2Si_2O_5$) | 4.1 | 0 | 4.8 | 0 | 0 | 0 |
| Zeolite A | 5 | 0 | 5 | 0 | 2 | 2 |
| Citric Acid | 3 | 5 | 3 | 4 | 2.5 | 3 |
| Sodium Carbonate | 15 | 20 | 14 | 20 | 23 | 23 |
| Silicate 2R ($SiO_2$:$Na_2O$ at ratio 2:1) | 0.08 | 0 | 0.11 | 0 | 0 | 0 |
| Soil release agent | 0.75 | 0.72 | 0.71 | 0.72 | 0 | 0 |
| Acrylic Acid/Maleic Acid Copolymer | 1.1 | 3.7 | 1.0 | 3.7 | 2.6 | 3.8 |
| Carboxymethylcellulose | 0.15 | 1.4 | 0.2 | 1.4 | 1 | 0.5 |
| Protease-Purafect ® (84 mg active/g; | 0.2 | 0.2 | 0.3 | 0.15 | 0.12 | 0.13 |
| Amylase-Stainzyme Plus ® (20 mg active/g) | 0.2 | 0.15 | 0.2 | 0.3 | 0.15 | 0.15 |
| Lipase-Lipex ® (18.00 mg active/g) | 0.05 | 0.15 | 0.1 | 0 | 0 | 0 |
| Amylase-Natalase ® (8.65 mg active/g) | 0.1 | 0.2 | 0 | 0 | 0.15 | 0.15 |
| Cellulase-Celluclean ™ (15.6 mg active/g) | 0 | 0 | 0 | 0 | 0.1 | 0.1 |
| TAED | 3.6 | 4.0 | 3.6 | 4.0 | 2.2 | 1.4 |
| Percarbonate | 13 | 13.2 | 13 | 13.2 | 16 | 14 |
| Na salt of Ethylenediamine-N,N'-disuccinic acid, (S,S) isomer (EDDS) | 0.2 | 0.2 | 0.2 | 0.2 | 0.2 | 0.2 |
| Hydroxyethane diphosphonate (HEDP) | 0.2 | 0.2 | 0.2 | 0.2 | 0.2 | 0.2 |
| $MgSO_4$ | 0.42 | 0.42 | 0.42 | 0.42 | 0.4 | 0.4 |
| Perfume | 0.5 | 0.6 | 0.5 | 0.6 | 0.6 | 0.6 |
| Suds suppressor agglomerate | 0.05 | 0.1 | 0.05 | 0.1 | 0.06 | 0.05 |
| Soap | 0.45 | 0.45 | 0.45 | 0.45 | 0 | 0 |
| Sulphonated zinc phthalocyanine (active) | 0.0007 | 0.0012 | 0.0007 | 0 | 0 | 0 |
| S-ACMC | 0.01 | 0.01 | 0.01 | 0 | 0 | 0 |
| Direct Violet 9 (active) | 0 | 0 | 0.0001 | 0.0001 | 0 | 0 |
| Sulfate/Water & Miscellaneous | Balance to 100 | | | | | |

Liquid laundry detergents can include the ingredients presented in Table 9.

TABLE 9

| | H Wt. % | I Wt. % | J Wt. % | K Wt. % | L Wt. % | M Wt. % |
|---|---|---|---|---|---|---|
| Glycerol | 3 | 5 | 6.1 | 0.6 | 5 | 5.3 |
| 1,2 Propanediol | 16 | 14 | 15.9 | 12 | 10 | |
| Citric acid | 1 | | 1.2 | | 0.5 | 0.5 |
| Isopropanol | | | | 7.7 | | |
| NaOH | 0.5 | | | | 1 | |
| Marlipal $C_{12-14}EO_7$ | 22 | | 11.8 | | 14 | 20.1 |
| $C_{13-15}EO_9$ | 1 | 15 | | | | |
| $C_{9-11}EO_9$ | | | | 72 | | |
| Linear alkyl benzene sulfonic acid[1] | 16 | 25 | 14.5 | | 23 | 24.6 |
| $C_{12-18}$ Fatty acid | 16 | 5 | 12.5 | | 6 | 16.4 |
| $C_{12-14}$ alkyl ethoxy 3 sulfate | | | 11.1 | | 9 | |
| Enzymes | 2.5 | 1.5 | 1.3 | 2.0 | 1.5 | 2.0 |
| Polyethyleneimine ethoxylate PEI 600 E20 | 2 | | 5.0 | | | 3.0 |
| Diethylene-triamine Pentaacetic Acid | | 0.9 | | | 1 | |
| Dequest 2010 | 1.5 | | | 1 | | 1.1 |
| Optical brightening agent | 1 | 1.2 | 2.5 | 0.5 | | 0.2 |
| Mg $Cl_2$ | | | 0.7 | | | 0.2 |
| Potassium sulfite | | | 0.5 | | 0.35 | 0.2 |
| Structurant | | 0.21 | 0.13 | | 0.15 | |
| Silicone softening agent (PDMS) | | | | | | 2.5 |
| Water | 8 | 10 | 7 | 6 | 9 | |
| Miscellaneous (dyes, aesthetics, perfume etc) | To 100 | To 100 | To 100 | To 100 | To 100 | To 100 |
| Monoethanol amine | To pH 7.6 | To pH 7.5 | To pH 7.4 | To pH 7.6 | To pH 7.6 | To pH 7.6 |

[1]Preferred LAS also comprise an alkyl group comprising from about 9 to about 15 carbon atoms, in straight chain configuration.

The detergents can include the formulation presented in Table 10.

TABLE 10

| | N Wt. % |
|---|---|
| Dimethyl monoethyl ether | 73.87 |
| Sodium lauryl sulfate | 6.00 |
| Dimethyl glyoxime | 1.00 |
| Isopropyl alcohol | 0.5 |
| Triazine stilbene (Tinopal UNPA-GX) | 0.4 |
| Monoethanol amine | 1.52 |
| Linear alcohol ethoxylate (Surfonic LF-17) | 13.61 |
| d-limonene | 3.00 |

The composition can include the formulation presented in Table 11.

TABLE 11

|  | O Wt. % | P Wt. % |
|---|---|---|
| Cationic Softener Active[1] | 65.0 | 65.0 |
| Fatty Acid[2] | 1.8 | 1.8 |
| TMPD[3] | 14.7 | 14.7 |
| Cocoamide 6EO[4] | 4.05 | 4.05 |
| Perfume | 5 | 2.5 |
| Perfume Microcapsules | — | 1.25 |
| Dye | 0.001 | 0.001 |
| Hexylene Glycol[6] | 5.63 | 5.6 |
| Ethanol[6] | 5.63 | 5.6 |

[1]Di(acyloxyethyl)(2-hydroxy ethyl) methyl ammonium methyl sulfate wherein the acyl group is derived from partially hydrogenated canola fatty acid.
[2]Partially hydrogenated canola fatty acid.
[3]2,2,4-trimethyl-1,3-pentanediol
[4]PEG 6 cocamide-polyethylene glycol amide of coconut fatty acid.
[5]Sodium salt of hydroxyethane diphosphonic acid
[6]Material included with softening active by supplier.

Multi-compartment pouches can contain a plurality of benefit agents. By way of a non-limiting example, a two- or three-component pouch may contain the formulations presented in Table 12 in separate enclosures, where dosage is the amount of the formulation in the respective enclosure.

TABLE 12

|  | Q 3 compartments | | | R 2 compartments | | S 3 compartments | | |
|---|---|---|---|---|---|---|---|---|
| Compartment # | 1 | 2 | 3 | 1 | 2 | 1 | 2 | 3 |
| Dosage (g) | 34.0 | 3.5 | 3.5 | 30.0 | 5.0 | 25.0 | 1.5 | 4.0 |
| Ingredients | | | | Weight % | | | | |
| Alkylbenzene sulfonic acid | 20.0 | 20.0 | 20.0 | 10.0 | 20.0 | 20.0 | | |
| Alkyl sulfate | | | | 2.0 | | | | |
| C12-14 alkyl 7-ethoxylate | 17.0 | 17.0 | 17.0 | | 17.0 | 17.0 | | |
| Cationic surfactant | | | | 1.0 | | | | |
| Zeolite A | | | | 10.0 | | | | |
| C12-18 Fatty acid | 13.0 | 13.0 | 13.0 | | 18.0 | 18.0 | | |
| Sodium acetate | | | | 4.0 | | | | |
| enzymes | 0-3 | 0-3 | 0-3 | 0-3 | | 0-3 | | |
| Sodium Percarbonate | | | | 11.0 | | | | |
| TAED | | | | 4.0 | | | | |
| Organic catalyst [1] | | | | 1.0 | | | | |
| PAP granule [2] | | | | | | | | 50 |
| Polycarboxylate | | | | 1.0 | | | | |
| Polyethyleneimine ethoxylate[3] | 2.2 | 2.2 | 2.2 | | | | | |
| Hydroxyethane diphosphonic acid | 0.6 | 0.6 | 0.6 | 0.5 | | | | |
| Ethylene diamine tetra(methylene phosphonic) acid | | | | | 0.4 | | | |
| Brightener | 0.2 | 0.2 | 0.2 | 0.3 | | 0.3 | | |
| Mineral oil | | | | | | | | |
| Hueing dye [4] | | | 0.05 | | 0.035 | 0.12 | | |
| Perfume | 1.7 | 1.7 | | 0.6 | | 1.5 | | |
| Water and minors (antioxidant, aesthetics, . . . ) | 10.0 | 10.0 | 10.0 | 4.0 | | | | |
| Buffers (sodium carbonate, monoethanolamine) [5] | | | | To pH 8.0 for liquids To RA >5.0 for powders | | | | |
| Solvents (1,2 propanediol, ethanol) for liquids, sodium sulfate for powders | | | | To 100% | | | | |

[1] Sulfuric acid mono-[2-(3,4-dihydro-isoquinolin-2-yl)-1-(2-ethyl-hexyloxymethyl)-ethyl]ester as described in U.S. Pat. No. 7169744
[2] PAP = Phtaloyl-Amino-Peroxycaproic acid, as a 70% active wet cake
[3] Polyethylenimine (MW = 600) with 20 ethoxylate groups per —NH.
[4] Ethoxylated thiophene, EO ($R_1 + R_2$) = 5
[5] RA = Reserve Alkalinity (g NaOH/dose)

In another embodiment of multicomponent pouches, the respective enclosures can be filled with liquid and solid benefit agents. Non-limiting examples of two compartment pouches, where one enclosure is filled with a liquid and one is filled with a solid, include combinations of the formulations presented in Tables 13 and 14.

TABLE 13

|  | T | U | V | W |
|---|---|---|---|---|
| Liquid formulation dosage | XL1 10 g Wt % | XL2 5 g Wt % | XL3 15 g Wt % | XL4 7 g Wt % |
| Marlipal C24-7 | 74 | | 20 | 14 |
| Non ionic surfactant Neodol 23-5 | | 55 | | |
| Anionic surfactant[1] | | 20 | 20 | 25 |
| Propane diol | 10 | 4 | 22 | 10 |
| Glycerol | 2 | 5 | 5 | |
| Soil dispersant[2] | | 2 | | |
| Amphiphilic alkoxylated grease cleaning polymer[3] | | | 5 | |
| Fatty acid | | | 10 | 20 |
| Enzymes | | | | 3 |
| Structurant | | | 3 | |
| Perfume | 7 | 10 | | |
| Water | 2 | 3 | 5 | |

TABLE 13-continued

|  | T | U | V | W |
|---|---|---|---|---|
| Monoethanol amine |  |  | To pH 7.5 |  |
| Minors |  |  | To 100% |  |

[1] Linear C11-13 alkyl benzene sulfonic acid
[2] $(bis(C_2H_5O)(C_2H_4O)_n)(CH_3)—N^+—CxH2x-N^+—(CH_3)-bis((C_2H_5O)(C_2H_4O)_n))$, wherein = from 15 to 30, and x = from 3 to 8.
[3] Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.

TABLE 14

|  | X | Y | Z | AA |
|---|---|---|---|---|
| Powder formulation | XP1 | XP2 | XP3 | XP4 |
| Dosage | 35 g | 25 g | 40 g | 30 g |
|  | Wt % | Wt % | Wt % | Wt % |
| Anionic surfactant |  | 20 | 20 | 20 |
| Cationic surfactant |  |  | 1.5 | 1.5 |
| Bleach agent | 20 | 36 | 36 | 36 |
| Chelating agent | 0.8 | 2 | 2 | 2 |
| Enzyme |  | 10 | 10 | 10 |
| Sodium carbonate |  | 6 | 4 | 4 |
| Sodium bicarbonate |  |  | 4 | 4 |
| Zeolite | 40 | 20 | 15 | 15 |
| Fluorescent whitening agent | 0.5 | 3 |  | 1 |
| Polymers | 2 |  | 5 | 5 |
| Sodium sulfate | 15 |  |  |  |
| Minors | To 100% | | | |

A hard surface cleaning composition, which may be used by professionals, can include the formulation presented in Table 15.

TABLE 15

| Ingredient Name | WT % |
|---|---|
| C10 alkyl alcohol-8-ethoxylate | 55.0 |
| Linear alkylbenzene sulfonic acid | 9.0 |
| Monoethanolamine | 2.4 |
| 1, 2 propanediol | 9.0 |
| Glycerol | 7.5 |
| C1218 alkyl fatty acid | 2.5 |
| Dye | 0.1 |
| Perfume | 2.2 |
| Water | Balance |

The foregoing description is given for clearness of understanding only, and no unnecessary limitations should be understood therefrom, as modifications within the scope of the invention may be apparent to those having ordinary skill in the art.

Throughout this specification and the claims which follow, unless the context requires otherwise, the word "comprise" and variations such as "comprises" and "comprising" will be understood to imply the inclusion of a stated integer or step or group of integers or steps but not the exclusion of any other integer or step or group of integers or steps.

Throughout the specification, where compositions are described as including components or materials, it is contemplated that the compositions can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

All patents, publications and references cited herein are hereby fully incorporated by reference. In case of conflict between the present disclosure and incorporated patents, publications and references, the present disclosure should control.

What is claimed:

1. A water-soluble film comprising:
   a polyvinyl alcohol (PVOH) resin blend comprising:
      a first PVOH copolymer comprising an anionic monomer unit, the first PVOH copolymer having a first 4% solution viscosity at 20° C. ($\mu_1$); and
      a second PVOH polymer consisting essentially of vinyl alcohol monomer units and optionally vinyl acetate monomer units, the second PVOH polymer having a second 4% solution viscosity at 20° C. ($\mu_2$);
   wherein:
      (A) an absolute viscosity difference $|\mu_2-\mu_1|$ for the first PVOH copolymer and the second PVOH polymer is in a range of 0 cP to about 10 cP, and the first PVOH copolymer is present in an amount in a range of about 30 wt. % to about 90 wt. % of total PVOH polymers and PVOH copolymers in the film; or
      (B) an absolute viscosity difference $|\mu_2-\mu_1|$ for the first PVOH copolymer and the second PVOH polymer is in a range of 0 cP to about 10 cP, and the anionic monomer unit is present in the film in an amount in a range of about 1.0 mol. % to about 4.2 mol. % of total PVOH polymers and PVOH copolymers in the film.

2. The water-soluble film of claim 1, wherein the second PVOH polymer is present in an amount in a range of about 10 wt. % to about 70 wt. % of total PVOH polymers and PVOH copolymers in the film.

3. The water-soluble film of claim 1, wherein the anionic monomer unit is present in the film in an amount in a range of about 1.0 mol. % to about 4.2 mol. % of total PVOH polymers and PVOH copolymers in the film.

4. The water-soluble film of claim 1, wherein the anionic monomer is selected from the group consisting of vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing, esters of the foregoing, and combinations thereof.

5. The water-soluble film of claim 1, wherein the anionic monomer is selected from the group consisting of acrylamido methylpropanesulfonic acids, alkali metal salts thereof, and combinations thereof.

6. The water-soluble film of claim 1, wherein the anionic monomer is selected from the group consisting of monomethyl maleate, alkali metal salts thereof, and combinations thereof.

7. The water-soluble film of claim 1, wherein the anionic monomer unit is present in first PVOH copolymer in an amount in a range of about 2 mol. % to about 10 mol. %.

8. The water-soluble film of claim 7, wherein the anionic monomer unit is present in first PVOH copolymer in an amount in a range of about 5 mol. % to about 10 mol. %.

9. The water-soluble film of claim 8, wherein the anionic monomer unit is present in an amount in a range of about 3 mol. % to about 4.2 mol. % of total PVOH polymers and PVOH copolymers in the film.

10. The water-soluble film of claim 1, wherein the PVOH resin blend consists essentially of the first PVOH copolymer and the second PVOH polymer.

11. The water-soluble film of claim 1, wherein a viscosity difference ($\mu_2-\mu_1$) for the first PVOH copolymer and the second PVOH polymer is in a range from about 0 cP to about 10 cP.

12. The water-soluble film of claim 1, wherein the first viscosity $\mu_1$ is in a range of about 4 cP to about 24 cP.

13. The water-soluble film of claim 1, wherein the second viscosity $\mu_2$ is in a range of about 4 cP to about 24 cP.

14. The water-soluble film of claim 1, wherein the water-soluble film has a residue value of about 45 wt. % or less as measured by the Dissolution Chamber Test.

15. The water-soluble film of claim 1, wherein the first PVOH copolymer and the second PVOH polymer each independently have a degree of hydrolysis in a range of about 75% to about 99%.

16. The water-soluble film of claim 1, wherein the PVOH resin blend comprises a third PVOH polymer.

17. The water-soluble film of claim 1, wherein the water-soluble film further comprises at least a third water-soluble polymer which is other than a PVOH polymer.

18. The water-soluble film of claim 17, wherein the third water-soluble polymer is selected from the group consisting of polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethylcelluloses and salts thereof, dextrins, ethylcelluloses, hydroxyethyl celluloses, hydroxypropyl methylcelluloses, maltodextrins, starches, modified starches, guar gum, gum Acacia, xanthan gum, carrageenan, polyacrylates and salts thereof, copolymers thereof, blends thereof, and combinations thereof.

19. The water-soluble film of claim 1, wherein the water-soluble film further comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, surfactants, and combinations thereof.

20. The water-soluble film of claim 1, wherein the water-soluble film further comprises one or more plasticizers in an amount in a range of about 1 wt. % to about 40 wt. % of the film.

21. An article comprising:
a. a water-soluble film, wherein the water-soluble film comprises:
a polyvinyl alcohol (PVOH) resin blend comprising:
a first PVOH copolymer comprising an anionic monomer unit, the first PVOH copolymer having a first 4% solution viscosity at 20° C. ($\mu_1$); and
a second PVOH polymer consisting essentially of vinyl alcohol monomer units and optionally vinyl acetate monomer units, the second PVOH polymer having a second 4% solution viscosity at 20° C. ($\mu_2$);
wherein:
(A) an absolute viscosity difference $|\mu_2-\mu_1|$ for the first PVOH copolymer and the second PVOH polymer is in a range of 0 cP to about 10 cP, and the first PVOH copolymer is present in an amount in a range of about 30 wt. % to about 90 wt. % of total PVOH polymers and PVOH copolymers in the film; or
(B) an absolute viscosity difference $|\mu_2-\mu_1|$ for the first PVOH copolymer and the second PVOH polymer is in a range of 0 cP to about 10 cP, and the anionic monomer unit is present in the film in an amount in a range of about 1.0 mol. % to about 4.2 mol. % of total PVOH polymers and PVOH copolymers in the film; and
b1. a household care composition proximal to the film, wherein the first PVOH copolymer is present in an amount of at least 65 wt. % of total PVOH polymers and PVOH copolymers in the film; or
b2. a composition other than a household care composition proximal to the film; or
b3. a household care composition proximal to the film, wherein the first PVOH copolymer is present in an amount of less than 65 wt. % of total PVOH polymers and PVOH copolymers in the film;
wherein the household care composition is selected from the group consisting of liquid detergent compositions, hard surface cleaning compositions, laundry detergent gels, bleach and laundry additives, fabric enhancer compositions, shampoos, body washes, and combinations thereof.

22. The article of claim 21, wherein the article comprises:
b1. the household care composition adjacent to the film, wherein the first PVOH copolymer is present in an amount of at least 65 wt. % of total PVOH polymers and PVOH copolymers in the film.

23. The article of claim 21, wherein the article comprises:
b2. the composition other than the household care composition adjacent to the film.

24. The article of claim 21, wherein the article comprises:
b3. the household care composition proximal to the film, wherein the first PVOH copolymer is present in an amount of less than 65 wt. % of total PVOH polymers and PVOH copolymers in the film.

25. The water-soluble film of claim 1, wherein:
(A) the absolute viscosity difference $|\mu_2-\mu_1|$ for the first PVOH copolymer and the second PVOH polymer is in a range of 0 cP to about 10 cP, and the first PVOH copolymer is present in an amount in a range of about 30 wt. % to about 90 wt. % of total PVOH polymers and PVOH copolymers in the film.

26. The water-soluble film of claim 1, wherein:
(B) the absolute viscosity difference $|\mu_2-\mu_1|$ for the first PVOH copolymer and the second PVOH polymer is in a range of 0 cP to about 10 cP, and the anionic monomer unit is present in the film in an amount in a range of about 1.0 mol. % to about 4.2 mol. % of total PVOH polymers and PVOH copolymers in the film.

27. The water-soluble film of claim 1, wherein the second PVOH polymer consists of vinyl alcohol monomer units and optionally vinyl acetate monomer units.

28. The water-soluble film of claim 25, wherein:

the second PVOH polymer is present in an amount in a range of about 10 wt.% to about 70 wt.% of total PVOH polymers and PVOH copolymers in the film;

the anionic monomer unit is present in the film in an amount in a range of about 1.0 mol.% to about 4.2 mol.% of total PVOH polymers and PVOH copolymers in the film;

the anionic monomer is selected from the group consisting of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing, esters of the foregoing, and combinations thereof; and the water-soluble film has a residue value of about 45 wt.% or less as measured by the Dissolution Chamber Test.

29. The water-soluble film of claim 26, wherein:
the anionic monomer unit is present in first PVOH copolymer in an amount in a range of about 3 mol.% to about 5 mol.%;
the anionic monomer is selected from the group consisting of acrylamido methylpropanesulfonic acids, alkali metal salts thereof, and combinations thereof;
the anionic monomer unit is present in the film in an amount in a range of about 1 mol.% to about 3 mol.% of total PVOH polymers and PVOH copolymers in the film;
the first PVOH copolymer is present in an amount in a range of about 40 wt.% to about 60 wt.% of total PVOH polymers and PVOH copolymers in the film;
the second viscosity $\mu_2$ is in a range of about 8 cP to about 16 cP; and
the second PVOH polymer is present in an amount in a range of about 40 wt.% to about 60 wt.% of total PVOH polymers and PVOH copolymers in the film.

30. The article of claim 21, wherein:
(A) the absolute viscosity difference $|\mu_2-\mu_1|$ for the first PVOH copolymer and the second PVOH polymer is in a range of 0 cP to about 10 cP, and the first PVOH copolymer is present in an amount in a range of about 30 wt.% to about 90 wt.% of total PVOH polymers and PVOH copolymers in the film;
the second PVOH polymer is present in an amount in a range of about 10 wt.% to about 70 wt.% of total PVOH polymers and PVOH copolymers in the film;
the anionic monomer unit is present in the film in an amount in a range of about 1.0 mol.% to about 4.2 mol.% of total PVOH polymers and PVOH copolymers in the film;
the anionic monomer is selected from the group consisting of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing, esters of the foregoing, and combinations thereof; and
the water-soluble film has a residue value of about 45 wt.% or less as measured by the Dissolution Chamber Test.

31. The article of claim 21, wherein:
(B) the absolute viscosity difference $|\mu_2-\mu_1|$ for the first PVOH copolymer and the second PVOH polymer is in a range of 0 cP to about 10 cP, and the anionic monomer unit is present in the film in an amount in a range of about 1.0 mol.% to about 4.2 mol.% of total PVOH polymers and PVOH copolymers in the film;
the anionic monomer unit is present in first PVOH copolymer in an amount in a range of about 3 mol.% to about 5 mol.%;
the anionic monomer is selected from the group consisting of acrylamido methylpropanesulfonic acids, alkali metal salts thereof, and combinations thereof;
the anionic monomer unit is present in the film in an amount in a range of about 1 mol.% to about 3 mol.% of total PVOH polymers and PVOH copolymers in the film;
the first PVOH copolymer is present in an amount in a range of about 40 wt.% to about 60 wt.% of total PVOH polymers and PVOH copolymers in the film;
the second viscosity $\mu_2$ is in a range of about 8 cP to about 16 cP; and
the second PVOH polymer is present in an amount in a range of about 40 wt.% to about 60 wt.% of total PVOH polymers and PVOH copolymers in the film.

32. A water-soluble film comprising:
a polyvinyl alcohol (PVOH) resin blend comprising:
  a first PVOH copolymer comprising an anionic monomer unit, the first PVOH copolymer having a first 4% solution viscosity at 20° C. ($\mu_1$); and
  a second PVOH polymer consisting essentially of vinyl alcohol monomer units and optionally vinyl acetate monomer units, the second PVOH polymer having a second 4% solution viscosity at 20° C. ($\mu_2$);
  wherein a viscosity difference ($\mu_2 - \mu_1$) for the first PVOH copolymer and the second PVOH polymer is in a range from about 0 cP to about 10 cP; and
  wherein:
    (C) the second viscosity $\mu_2$ is about 20 cP or less, and the first PVOH copolymer is present in an amount in a range of about 30 wt.% to about 90 wt.% of total PVOH polymers and copolymers in the film; or
    (D) the second viscosity $\mu_2$ is about 20 cP or less, and the anionic monomer unit is present in the film in an amount in a range of about 1.0 mol.% to about 4.2 mol.% of total PVOH polymers and PVOH copolymers in the film; or
    (E) the first PVOH copolymer is present in an amount in a range of about 30 wt.% to about 70 wt.% of total PVOH polymers and PVOH copolymers in the film.

33. The water-soluble film of claim 32, wherein:
(C) the second viscosity $\mu_2$ is about 20 cP or less, and the first PVOH copolymer is present in an amount in a range of about 30 wt.% to about 90 wt.% of total PVOH polymers and copolymers in the film.

34. The water-soluble film of claim 32, wherein:
(D) the second viscosity $\mu_2$ is about 20 cP or less, and the anionic monomer unit is present in the film in an amount in a range of about 1.0 mol.% to about 4.2 mol.% of total PVOH polymers and PVOH copolymers in the film.

35. The water-soluble film of claim 32, wherein:
(E) the first PVOH copolymer is present in an amount in a range of about 30 wt.% to about 70 wt.% of total PVOH polymers and PVOH copolymers in the film.

36. An article comprising:
a. a water-soluble film, wherein the water-soluble film comprises:
   a polyvinyl alcohol (PVOH) resin blend comprising:
      a first PVOH copolymer comprising an anionic monomer unit, the first PVOH copolymer having a first 4% solution viscosity at 20° C. ($\mu_1$); and
      a second PVOH polymer consisting essentially of vinyl alcohol monomer units and optionally vinyl acetate monomer units, the second PVOH polymer having a second 4% solution viscosity at 20° C. ($\mu_2$);
      wherein a viscosity difference ($\mu_2-\mu_1$) for the first PVOH copolymer and the second PVOH polymer is in a range from about 0 cP to about 10 cP; and
   wherein:
      (C) the second viscosity $\mu_2$ is about 20 cP or less, and the first PVOH copolymer is present in an amount in a range of about 30 wt.% to about 90 wt.% of total PVOH polymers and copolymers in the film; or
      (D) the second viscosity $\mu_2$ is about 20 cP or less, and the anionic monomer unit is present in the film in an amount in a range of about 1.0 mol.% to about 4.2 mol.% of total PVOH polymers and PVOH copolymers in the film; or
      (E) the first PVOH copolymer is present in an amount in a range of about 30 wt.% to about 70 wt.% of total PVOH polymers and PVOH copolymers in the film; and
b1. a household care composition proximal to the film, wherein the first PVOH copolymer is present in an amount of at least 65 wt.% of total PVOH polymers and PVOH copolymers in the film; or
b2. a composition other than a household care composition proximal to the film; or
b3. a household care composition proximal to the film, wherein the first PVOH copolymer is present in an amount of less than 65 wt.% of total PVOH polymers and PVOH copolymers in the film;
wherein the household care composition is selected from the group consisting of liquid detergent compositions, hard surface cleaning compositions, laundry detergent gels, bleach and laundry additives, fabric enhancer compositions, shampoos, body washes, and combinations thereof.

* * * * *